(12) United States Patent
Gray et al.

(10) Patent No.: US 7,330,832 B1
(45) Date of Patent: Feb. 12, 2008

(54) MECHANISM FOR SHARING OF GUARANTEED RESOURCES

(75) Inventors: Tom Gray, Carp (CA); Michael Weiss, Ottawa (CA)

(73) Assignee: Mitel Networks Corporation (CA)

( * ) Notice: Subject to any disclaimer, the term of this patent is extended or adjusted under 35 U.S.C. 154(b) by 1267 days.

(21) Appl. No.: 09/611,054

(22) Filed: Jul. 6, 2000

(30) Foreign Application Priority Data

Jul. 9, 1999 (GB) ................................. 9916208.3

(51) Int. Cl.
*G06Q 40/00* (2006.01)

(52) U.S. Cl. ........................... 705/37; 705/7; 709/226; 718/104

(58) Field of Classification Search ................ 379/112, 379/114; 705/37, 7; 709/226; 718/104
See application file for complete search history.

(56) References Cited

U.S. PATENT DOCUMENTS

| | | | | |
|---|---|---|---|---|
| 5,640,569 A | | 6/1997 | Miller et al. ................. | 710/241 |
| 5,996,013 A | * | 11/1999 | Delp et al. ................... | 709/226 |
| 6,005,925 A | * | 12/1999 | Johnson et al. ......... | 379/115.02 |
| 6,374,227 B1 | * | 4/2002 | Ye ................................ | 705/8 |
| 6,498,786 B1 | * | 12/2002 | Kirkby et al. ............... | 370/322 |
| 6,501,765 B1 | * | 12/2002 | Lu et al. ...................... | 370/447 |
| 6,587,865 B1 | * | 7/2003 | Kimbrel et al. ............. | 718/104 |
| 7,007,166 B1 | * | 2/2006 | Moskowitz et al. ........ | 713/176 |

FOREIGN PATENT DOCUMENTS

GB        2311689        10/1997

OTHER PUBLICATIONS

Khasnabish, B., Integrated Bandwidth and Congestion Management in ATM Networks Using a Simple Learning Algorithm and a Bucket Bank, Bell-Northern Research Ltd., Ontario, Canada, 1993, pp. 388-396.*
Bird, S., Toward a Taxonomy of Multi-Agent Systems, Albers School of Business and Economics, Seattle, Washington, 1993, pp. 689-704.*
MacKie-Mason, J. et al., The Role of Responsive Pricing in the Internet, Jun. 1, 1996.*

* cited by examiner

*Primary Examiner*—Hani M. Kazimi
*Assistant Examiner*—Stefano Karmis
(74) *Attorney, Agent, or Firm*—Jones Day

(57) ABSTRACT

A method for service allocation among a plurality of entities requiring service allocation in a communications or computing environment comprising the steps of initializing a supply of services of one or more holding entities, endowing one or more bidding entities with an adjustably fixed amount of utility and a requirement for an amount of the supply of services, wherein the fixed amount of utility is a measure representative of the possibility of failure due to lack of resources, negotiating the supply of services of the holding entities, with each bidding entity bidding a selected amount of its fixed amount of utility, and redistribution of the supply of the holding entities among the bidding entities based on the negotiating.

28 Claims, 18 Drawing Sheets

MECHANISM FOR SHARING OF GUARANTEED RESOURCES

FIELD OF THE INVENTION

This invention relates in general to the field of resource allocation and in particular to a mechanism for allocation of resources in communications and computing environments where real time considerations are important.

BACKGROUND OF THE INVENTION

In many communications and computing systems, multiple applications share resources. Each of these applications requires access to other software and hardware resources of the communications and computing system. It is important that the sharing of these resources be done in a way that will fulfill the overall goals of the users and administrators of the system. Applications must have access to the resources of the system in a manner that is congruent with both the capacity of the system and the quality of services required by the application. In case of shortages of resources, more important applications should be given access to resources at the expense of less important applications so that more important functions can be maintained.

Typically, each application of a system is independent of others and the requirements of each application will vary from moment to moment. The sharing of resources of the system cannot be strategically fixed since the applications and the relative priority of these applications are all highly dynamic.

In a real time environment, it is necessary that real time applications get access to needed resources within the time constraints required of their tasks.

Real time systems can be characterized as those that must supply services that meet both absolute and relative time constraints. Real time systems are not necessarily those where the time requirements are short. A successful real time system is one that can meet the time guarantees for the applications using them. The time requirements may be short or long. It is desirable that a real time system be able to set and adjust the timing commitments for the services that it can provide to applications and monitor compliance, taking remedial action if necessary. Real time operation is necessary for the performance of a service. It is also necessary to make run time decisions for allocations of resources.

In some cases, real time constraints are considered to be inflexible or hard. Hard real time constraints are system requirements whose violation would lead to the defeat of the system purpose and possibly severe system instability. It is desirable that a system be able to adjust priorities to ensure that hard time constraints are met.

There is always a specific set of resources available to any system. Of necessity, this set of resources is finite. Applications compete with each other for access to resources. Coordination and allocation mechanisms need to be put in place which partition these resources to applications in a way which optimizes the performance to meet the overall system needs.

In the past, it has been common to use a mechanism for resource allocation that employs an economic model. Each application is allocated or initialized with a description of the necessary resources, including capacity and type of resource it requires, as well as an amount of economic utility which acts as a form of money with which to obtain or "buy" the resources. Applications enter a negotiation phase among themselves in which they buy and sell resources or access to resources to meet their needs. This economic model produces a rationality which can collapse the complicated logic of the relative importance of applications and allows for the sharing of resources in an attempt to minimize the expenditure of utility.

Applications using the economic model for resource allocation are structured to conserve the amount of utility that they expend. The mechanism is self-regulating. High priority applications are given more utility. They can use this in negotiation to outbid less important applications for the resources they need. In addition, applications can share resources and expend their utility across multiple resources. Applications must expend a higher amount of utility to obtain higher demand resources.

In a traditional communication or software system, the system must be designed to be reliable and manageable so that it will behave in a predictable manner and properly function. However, as systems become large and complex, they become difficult to understand, maintain and modify. As systems become more dynamic, understanding their temporal characteristics becomes more difficult, and therefore understanding and correlating the overall system behavior is very difficult and time consuming. Hence, in such complex systems, an agent approach has frequently been adapted to simplify the design and management of these complex communications and computing systems. An agent based approach means that the overall problem can be partitioned into a number of smaller, simpler components which are easier to develop, maintain, manage and supplement. Agent based solutions frequently provide a natural means of modeling a problem so that real world entities and their interactions can be mapped into autonomous problem solving agents which have their own resources and expertise and can interact with others to get the tasks done.

The concept of a general system using agents has been described in the publications "Toward A Taxonomy of Multi-Agent Systems", Int. J. Man-Machine Studies (1993), 39, 689-704, Academic Press Limited, and "An Intelligent Agent Framework for Enterprise Integration" by Jeff Y. C. Pan and Jay M. Tenenbaum, Transactions on Systems, Man and Cybernetics, (Vol. 21, No. 6, November/December, 1991, pages 1391-1407.)

Mihai Barbuceanu and Mark S. Fox, ("Integrating Communicative Action, Conversation and Decision Theory in a Coordination Language for Multi-Agent System", (1996) University of Toronto) have disclosed a language and design for providing objects and control structures to substantiate the construction of real multi-agent systems in industrial domains where agents communicate using structured conversations.

Tuomas Sandholm and Victor Lesser ("Issues in Automated Negotiations and Electronic Commerce; Extending the Contract Net Framework" in proceedings of the First International Conference on Multi-Agent Systems (ICMAS-95), pages 328-335, San Francisco) have discussed issues that arise in automated negotiation among self interested agents and have described a negotiation protocol and numerous message formats for negotiation of a contract between two agents.

The Spawn system (described in IEEE Transactions on Software Engineering, Vol. 18, No. 2, February, 1992, pages 103-117), discloses a computational system which is organized as a market economy composed of interacting buyers and sellers. The spawn system allows processes in an operating system to purchase the CPU time they need.

Michael P. Wellman, in the paper entitled "A computational Market Model for Distributed Configuration Design", Proceedings of the Twelfth National Conference on Artificial Intelligence"; Jul. 24, 1994 discloses a negotiation system that allows distributed systems to configure themselves out of a catalog of resources. However, none of the systems described above disclose an agent based negotiation system that is tailored for real time systems. In both the Spawn and Wellman systems, a purchaser buys the use of a resource. This results in the purchaser owning rights to a resource. In the case of real time systems, this strategy can have difficulties. A real time application, when it needs a resource, will typically not have sufficient time to negotiate for its service requirements. The level of service must be guaranteed beforehand. There is a commercial need for a mechanism for negotiating a guarantee of service rather than the direct ownership shown in the previous models.

SUMMARY OF THE INVENTION

According to one aspect of the invention, there is provided a mechanism to allocate services, resources or both through the use of negotiated guarantees. The method and system of the present invention can be applied to any entity which shares resources based on the principle of guaranteed service rather than a specific sale. Entities are typically applications or running a computer or electronic device, but the invention can easily be adapted to other requirements. These principles can be especially important in the field of the sharing of bandwidth in ATM networks and in the sharing of access to database systems.

In any such system, the services of the environment must be defined, characterized or enumerated and assigned. This can be done manually during set-up or initialized by an initializer mechanism. In one embodiment of the invention, the system is started, particular instances of devices make themselves known to the system, and they are then assigned to a controller device, process or entity which holds control of that instance and makes it available to entities.

According to the present invention, entities are provided with economic utility in amounts in proportion to their priority or importance. In one embodiment priority is established by providing more utility to entities of greater priority or importance in avoiding failure of the system or an aspect of the system. This ranking may be done by a system operator or by some dynamic mechanism. Any well known means for ranking or dynamically adjusting may be used. However, rather than allocating a "quantity" of utility to obtain resources, the present invention uses utility to allocate the "possibility of failure due to lack of resources". That is, an entity purchases guarantees of service but these guarantees can be withdrawn if another entity is willing to pay more.

Thus, an important feature of the present invention is that it makes any amount of resource available to an entity if it has enough importance. Any amount, up to a set resource maximum can be available to an entity if the entity has enough importance.

Another feature of the present invention is that resources are removed from entities if the entity is not sufficiently important. According to this aspect, the service is adapted to the overall needs of the system. Furthermore, less important entities do not have to agree to the removal of resources allocated to them. Although the resources may be vitally important to the less important entity, the entity can be allowed to fail to maintain a more important entity.

In another aspect of an embodiment of the present invention, a supply curve for the provision of a resource can be formulated based on the current holding price, bid price and current resource allocation. Using the supply curve, the requesting entity can be provided with the amount it has to pay to get the corresponding quantity of resources that it needs.

The present invention is dynamically adjustable and encourages an efficient use of resources by requiring an entity to gain enough utility to pay for a resource. Entities therefore do not squander utility on unneeded resources. Furthermore, with the mechanism of the present invention, entities return unneeded resources to a common pool for later reallocation. This can be stimulated by a dynamic change in the supply of services, such as adding a new resource or capability, or removal or degradation of a service or resource, a change in the allocation of utility, or a change in the requirements for services or resources by an entity. This encourages efficiency and fosters learning for later reuse. In this manner, the present invention is adaptive, self-configuring and able to meet new contingencies as they arise.

A further aspect of an embodiment of the present invention allows for the allocation of resources through pre-negotiated guarantees to create an environment of guarantees. Many real time applications do not have the necessary time to negotiate for resources during their operation. Instead, by utilizing the present invention, applications can be provided beforehand with a guarantee that a resource will be available when the application requires it. This is done through a procedure of negotiation of guarantees between the requesting entity needing the resource and the supplier of the resource. This negotiation is facilitated by the use of agents by the application and the resource supplier. The agent for the requester predicts and stipulates the quantity of resources it requires to meet its anticipated future needs. Similarly, the supplier agent estimates the future load that application agents will generate and calculate the chances of failure in meeting these requests. The supplier agent uses its calculations as a basis for making guarantees to entities. Once an entity gets a resource guarantee, it will hold the guarantee as long as the application needs it (unless it is taken away). This is in contrast to prior art systems where the supplier will make a specific sale. In these prior art systems, new resources must constantly be made available as time passes to meet necessary needs of applications. In contrast, the mechanism of the present invention provides facilities to free resources and re-prioritize the user of existing resources by appropriately taking them away from existing entities upon a new request.

Therefore, according to one aspect of the present invention there is provided; a method for allocating services among a plurality of entities requiring services in a communications or computing environment comprising the steps of: a) initializing a supply of services of one or more holding entities; b) endowing one or more bidding entities with an adjustably fixed amount of utility and a requirement for an amount of said supply of services, wherein said fixed amount of utility is a measure representative of the possibility of failure due to lack of resources; c) negotiating the supply of services of the holding entities, with each bidding entity bidding a selected amount of the fixed amount of utility; d) redistribution of the supply of the holding entities among the bidding entities based on the negotiating.

According to a further aspect of the present invention there is provided a system for service allocation among a plurality of entities requiring services in a communications or computing environment comprising: a) one or more holding entities having a supply of services; b) a plurality of bidding entities endowed with an adjustably fixed amount of utility and a requirement for an amount of said supply of services, wherein said fixed amount of utility is a measure representative of the possibility of failure due to lack of resource; c) a broker for negotiating the supply of services of the holding entities, with the bidding entities bidding a selected amount of its said fixed amount of utility; wherein said holding entity provides redistribution of said supply among said bidding entities based on said negotiating.

DETAILED DESCRIPTION OF THE PREFERRED EMBODIMENT

According to the present invention, resources are allocated to entities on the basis of negotiated guarantees of availability within the context of an economic model. In any real world implementation, the supply of known resources is fixed, but changes as resources are depleted or new resources are added and frequently certain resources are scarce. In a real world system the amount of resources available at any particular time for which there is resource contention is identifiable, quantifiable and allocable, and may be preset or determined by a configuration, registration or polling exercise. This exercise may be performed all at once, or in a stepwise fashion, with the services being first defined, then instances of the services being established, and finally the responsibility for the service being allocated to the responsible holding entity. This may be performed in hardware, firmware, or software and can be dynamically adjusted, rebalanced and redistributed as entity requirements change.

In a similar manner, entities during initialization or during system operation are endowed with a requirement for a service or resources as conditions warrant as well as "utility" for bidding. An entity may be a physical device, a program or application or a higher level abstraction thereof embodied in physical devices or applications operating in an intelligent manner such as an agent. Applications or processes may be stored as software in memory operating under control of a processor. An entity that requires a service or a resource makes a prediction of the amount of resource that it needs in order to meet its expected load. This prediction is based on the possibility of the failure of the resource to be available at the instant that the entity needs it. This possibility of failure can be traded off against the price that the entity has to pay for the resource. Thus, the charge to the entity for the resource is not specifically for the quantity of resource used alone, but for the possibility of having that resource unavailable or removed. It should be appreciated that a resource or resources can be embodied in or managed by one or more entities. Initialized services or resources are assigned to holding entities and reallocated through appropriate signals, signaling methods and protocols. Also, bids requested as messages using such signaling methods and protocols are connected among entities. The invention is not limited to any specific method protocol or message format; any suitable signaling method, protocol and message format may be used.

In the preferred embodiment, the mechanism of the present invention is utilized through the use of agents. While the invention is described with respect to agents, the invention is not limited to the agent context. The invention can easily be adapted to any resource allocation situation. The invention is best described by way of an example of an architecture in which it is implemented.

Figure 1:
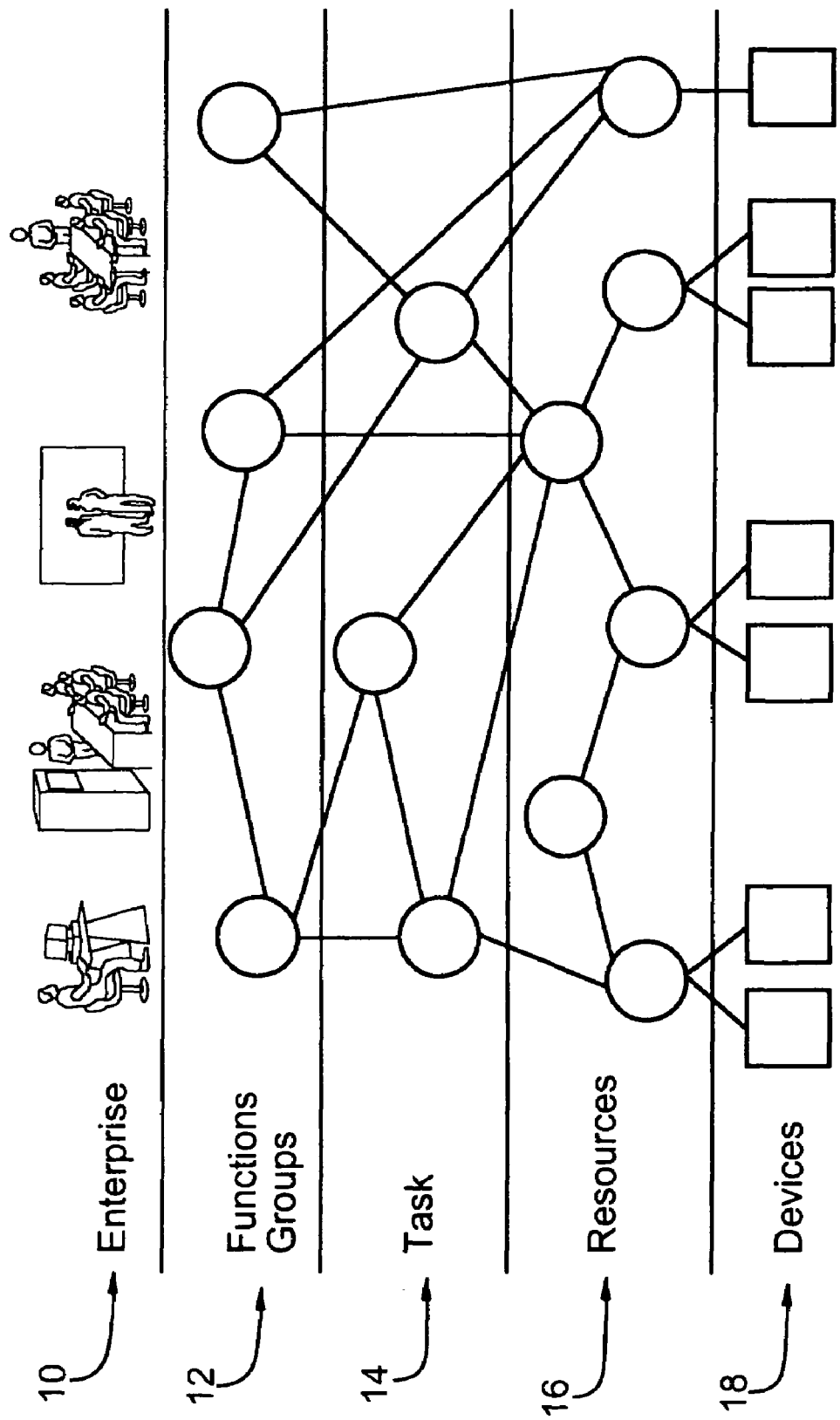
FIG. 1 is a declarative model of an architecture embodying the present invention.

Turning to FIG. 1, a declarative model of an architecture embodying the present invention is illustrated. The architecture of FIG. 1 produces a mapping of concepts from the highest level of abstraction to the lowest. The architecture can be described in terms of five levels of abstraction. At the highest level of abstraction, the enterprise 10 utilizing the invention can be viewed as a system with the set of goals to be achieved. The overall goals of the system are divided into smaller goals and distributed among functional groups 12. Each of these functional groups 12 is responsible for a portion of the overall goals of the enterprise 10. The goals of a functional group 12 are defined as an action to be performed using a set of services. Each service consists of a linked group of tasks 14 operating under functional groups 12. A task 14 can be viewed as a complex resource which has been tailored to the idiosyncratic needs of function group 12 of the enterprise 10. Each task 14 draws upon an abstract resource 16 which consists of multiple physical resources which can share a common Application Programming Interface (API). The abstract resource 16 draws upon one or more physical devices 18.

Physical devices 18 described herein include processes, applications, devices, memories or machines that make up a resource 16 that can accomplish a task 14 or part of a task 14, and are defined by their capabilities and capacities. Processes and applications described herein are comprised of computer software executed on a processor, which includes any required program and data storage apparatus, such as random access or disk memories. Physical devices 18 are owned, and have their capabilities distributed via ownership. A physical device 18 is limited; external physical devices 18 are not aware of how tasks 14 are accomplished outside of the physical device 18. A physical device 18 may contain other physical devices 18, processes and agents internally, but these internal elements are not visible externally. The invention is not limited to any particular physical device and can include personal computers, servers, printers, telephones, switches, networks, data storage equipment, data transmission equipment or virtually any electronic or intelligent or intelligently controlled equipment.

In one preferred embodiment, physical devices include telephone interface circuits, trunk interface circuits, telephones, telephone lines, telephone line interfaces and telephone switches for establishing or maintaining a voice or data communication.

The mechanism of the present invention is described as operating to allocate resources 16 of physical devices 18, but can be employed between higher and lower level agents through the various levels of abstraction of FIG. 1.

In order to utilize the present invention an initialization exercise is performed manually, during set-up or dynamically by an initialization mechanism that defines the character of the entities, the relationship between the entities, the services, the initial allocation of services among holding entities, the supply and character of resources and protocol for communications and negotiation. This is further illustrated in the example using agents.

Agents

An agent is an identifiable entity, as will be described below in more detail, which can accept a goal or goals, and produce an outcome. That outcome may be another goal or a set of goals. An agent may be the external representation of a physical device 18. A requirement or goal at the enterprise 10 level is mapped to a function provided by one of the functional groups 12. These are then mapped to tasks 14 at task level which draw upon abstract resources 16 at resource level which utilize the physical devices 18 at device level. Each level of the architecture provides a service to the layer above which is utilized by the layer above to achieve its goals. Communication between the layers can be done by agents. The interfaces between the various layers of the architecture and between various components in the architecture can be provided by agents. Furthermore, each layer optionally provides multiple service levels to attain various goals. The services provided at each layer are offered at various levels of capacity and quality. An example of a system employing agents is described in U.S. Pat. No. 5,638,494 of Pinard et al.

An agent only functions for the goals of which it has knowledge. A method for accomplishment of each goal is associated with each goal. These methods may involve some degree of planning or management, within the agent.

An agent may directly represent a physical device 18, or work through intermediate agents or intermediate physical devices 18, but is associated with its intermediate physical devices 18 through an abstract resource 16.

An agent sees only the portion of the capabilities of a physical device 18 or of another agent that it is entitled to use. This is referred to as the representation of the physical device 18 or of the resource 16. A resource 16 may consist of the representations of several devices and means for selecting from them. The means for selecting from several physical devices 18 is referred to as brokering.

A goal is an input to an agent, and specifies a task 14 or a sub task which an agent is to perform. Each goal is associated with a method for accomplishing the goal, as described in more detail later in this specification.

The capability of endowing an agent with goals and resources 16 is referred to as jurisdiction. Thus a higher level agent may use a lower level agent over which it has jurisdiction, as part of its goal definition, and thus it may endow the lower level agent with capabilities. A higher level agent with jurisdiction can provide another agent with a services using a lower level agent as a resource 16.

The right to use parts of the capability and the capacity of a resource 16 or physical device 18 is referred to as ownership, and the granting of rights to a physical device 18 to be used may only be done through ownership by an agent with jurisdiction. Ownership can be shared and may be of several types: constant, statistical, deterministic, or as available.

Ownership may be devolved through a hierarchy. Devolved ownership carries constraints: a devolved owner may devolve any type of ownership it has and add constraints, but may not remove constraints placed on a physical device 18 or another agent by a higher level agent. Ownership is also devolved on different time scales. Some higher level agents will require almost permanent ownership of a physical device 18. This ownership can be devolved dynamically, such as when a group allocates the rights to a group member for a single transaction.

An allocated physical device 18 may police its submitted goals to be sure that no other agent is exceeding its ownership rights. However, policing may not be necessary if done informally by policy.

The technique used by a resource 16 to select among physical devices 18 which can be used to accomplish a goal, is the allocation mechanism. The allocation mechanism is designed locally for the purposes of obtaining the resource 16. Together with the device representations, the allocation mechanism constitutes a broker within the resource 16. The broker is designed to achieve a purpose local to the resource 16, e.g. lowest cost, quality, reliability, redundancy, most suitable device, etc. and participates in the bidding, utilizing the mechanism for sharing of guaranteed resources of the present invention as described in further detail below.

Figure 2:
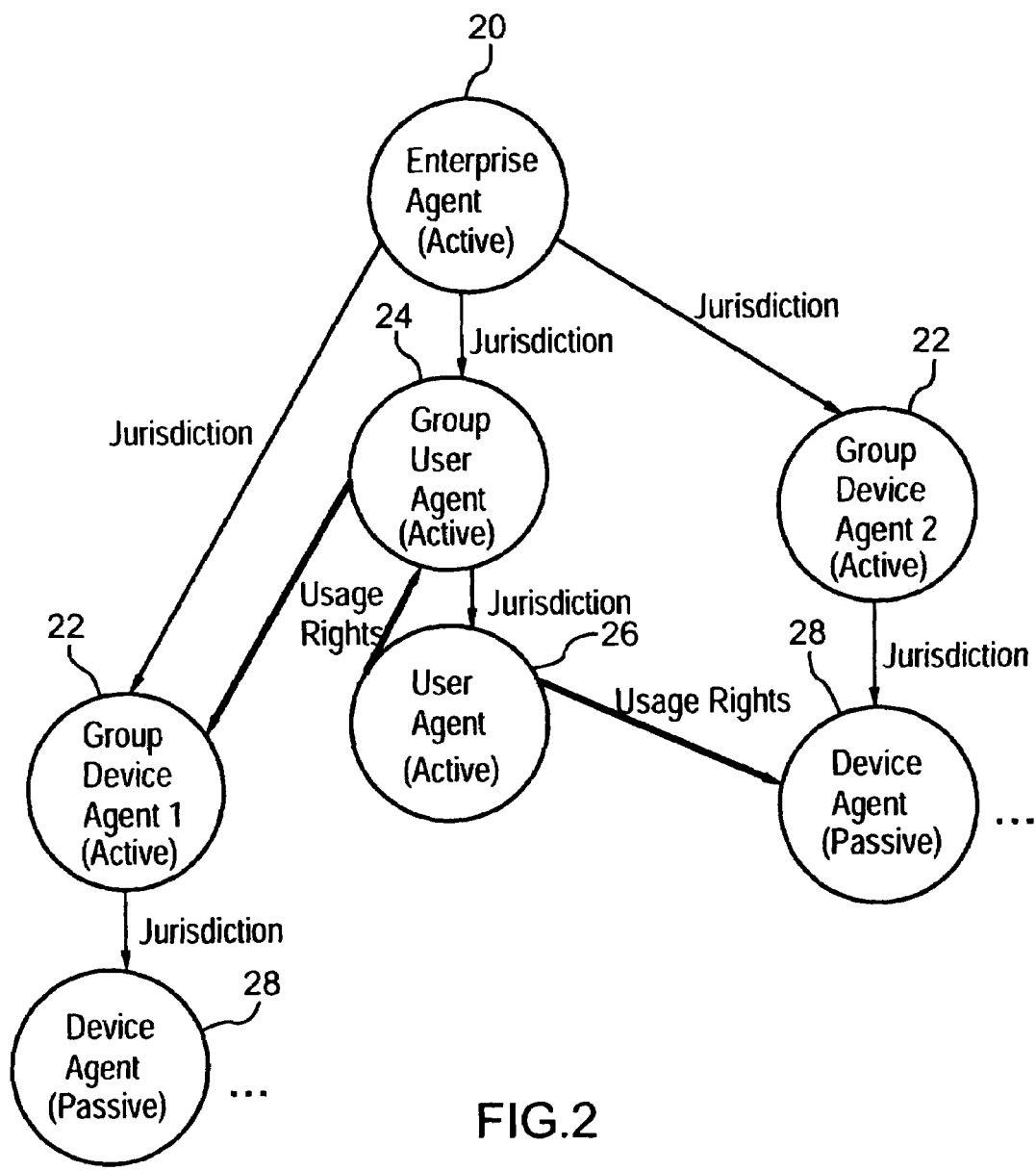
FIG. 2 is a relationship diagram of various agents used in the architecture of FIG. 1.

FIG. 2 illustrates a logical view of agent to agent communication used in the present invention. Jurisdiction is shown by a solid line arrow and usage rights is shown by a broken line arrow. An enterprise agent 20 has jurisdiction over all the other agents below it in hierarchy, e.g. group device agents 22, group user agents 24, etc. Similarly, the group user agent has jurisdiction over the user agents 26 below it, the group device agents have jurisdiction over the device agents 18 below them, etc. The group user agent 24 has usage rights over a portion of the service provided by group device agent 22. The user agent 26 has usage rights over a portion of services provided by the device controlled by the device agent under group device agent 28.

Brokers can select among resources the agent has usage rights over in order to better accomplish a goal, or can grant usage rights to another agent, or can set up goals and usage rights for its agent, or can customize resources which the agent has usage rights over.

A passive agent can only accept goals which can be accomplished without requiring resources from another agent. A passive agent is an atomic agent, typically representing a physical device 18.

Agents can be specialized for different types of work.

A group user agent 24 could represent a group of people which have been assigned a task to perform. A user agent 22 could represent a single person.

A group device agent 22 could be the initiator, or configurator, or creator of device agents 28 for a particular physical device type.

A device agent could represent data, or a task that a person can perform, or a physical device 18 including the actions of the device as well as setup information. This is a passive agent.

In the preferred embodiment, brokers and agents communicate using a blackboard system.

Blackboard systems have been described in the publications "Blackboard Systems", by Daniel Corkill, published in AI Expert, September 1991, pp 41-47, "Blackboard Systems: The Blackboard Model of Problem. Solving and the Evolution of Blackboard Architectures" by H. Penny Nii, Published in The AI Magazine, Summer 1986, pp. 38-53, and "Elevator Scheduling System Using Blackboard Architecture", by Grantham K. H. Pang, published in IEEE Proceedings-D, Vol. 138, No. 4, July 1991, pp-337-346.

Figure 3:
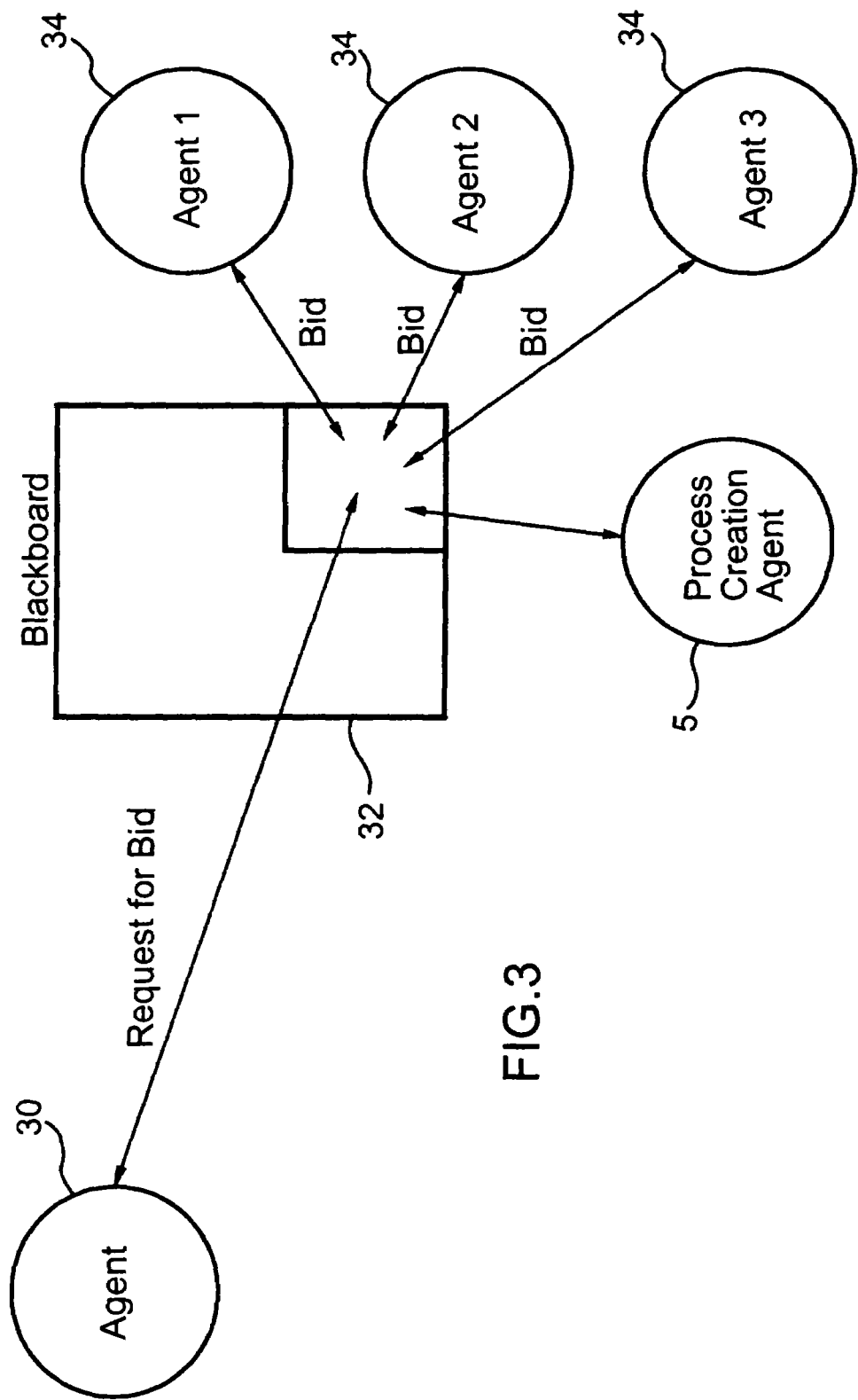
FIG. 3 is a block diagram of a blackboard system used for communication between agents in the architecture of FIG. 1.

As illustrated in FIG. 3 a resource-requesting agent 30 requiring a resource posts a request to a blackboard (RAM) 32. This is interpreted by resource supplier agents 34 as a request for bids. Agents 34 then post bids to complete the process, in accordance with the resources 16 over which they have jurisdiction, and the economics of the completion of the job. In the present invention, the agents have particular design, and contain brokers, as will be described in more detail below.

Figure 4:
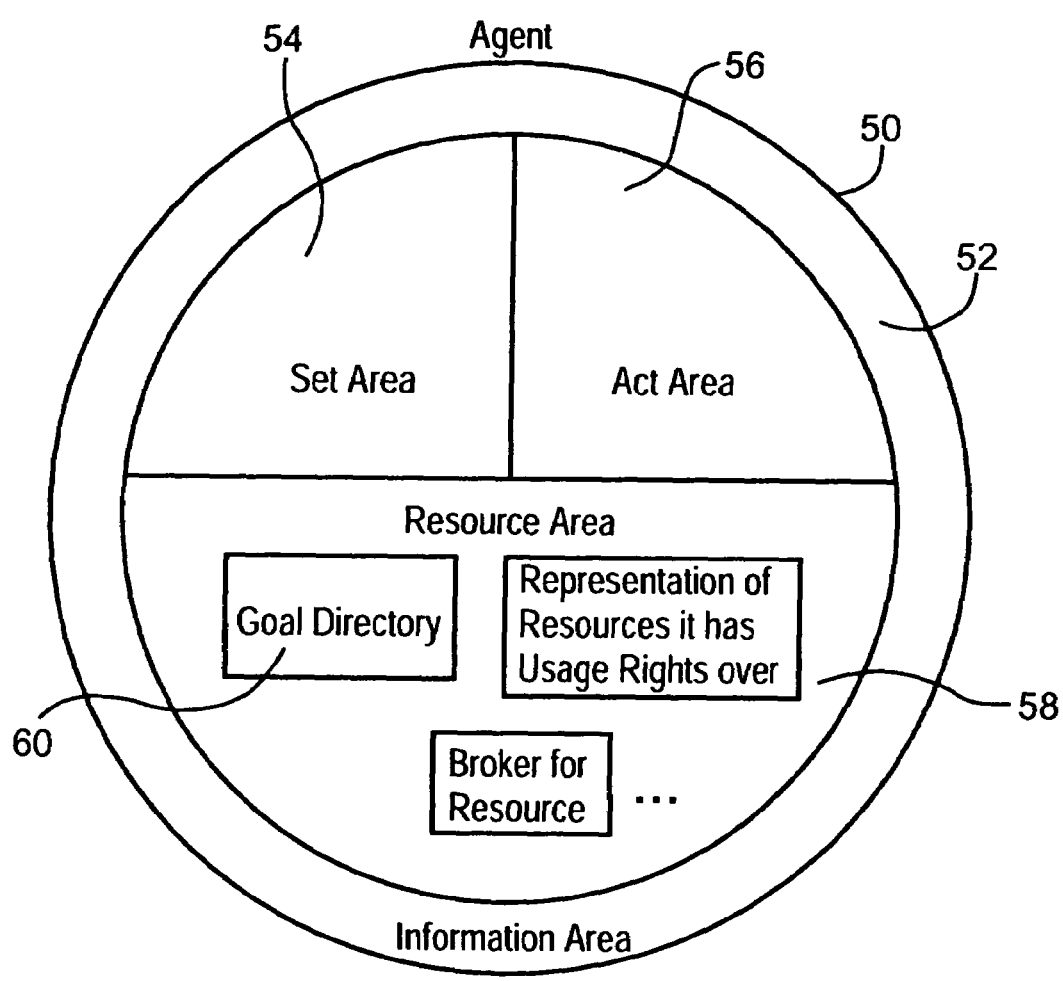
FIG. 4 is a diagram illustrating the general structure of an agent of FIGS. 2 and 3.

The structure of an agent 30 is shown in general in FIG. 4. The agent is categorized into four parts: an information area 52, a set area 54, an act area 56, and a resource area 58.

The information area 52 represents an area to which the agent posts information about its resources. Any agent which has usage rights over resources, or portions of resources, in this agent has read privileges for this area, if it can gain access to it. Access can be by direct read or be message based.

The set area 54 represents the ability of an agent to accept setup goals. In a passive agent, it can only accept goals which do not decompose into goals for other agents.

The act area 56 represents the ability of an agent to accept an acting goal and to decompose it into other goals which it passes on to other agents, or into resources to which it has usage rights. In a passive agent, goals can only decompose into resources that require no other agent interactions.

The resource area 58 represents the data and knowledge sources needed in the decomposition of a goal. It is private to the agent. A goal directory 60 breaks goals down into their constituent parts, is written to and from the set area 54, and is used from the act area 56. The representation of the resources including basic function, capacity, constraints, bidding mechanism, etc., is also contained in this area, as well as the knowledge source needed to utilize a resource. This can also be written from the set area 54, and used from the act area 50.

In order to set up a system of processes or applications, with agents that have no knowledge of other agents and what resources they use, or how they use them, an initialization procedure or an initializer mechanism is used. The initializer provides the initial setup of the system and defines the processes, decomposes them into goals for various agents, and the resources needed to accomplish each goal. One aspect of the initializer is that it characterizes the supply of the various services of holding entities available to bidding entities. In this manner, aspects of the system are defined. In a preferred embodiment of the invention, this is accomplished by a system which defines in databases the enterprise 10 in terms of the organizational structure, including the users, the physical devices 18 and the resources 16 that they use. The processes that need to be done are described, including the users, groups and resources 16 needed to accomplish each part of them, and in what order. Once the databases are complete, they are decomposed into the goals and resources needed in each agent, and the agents are downloaded with this data. A process is defined as a series of goals, which need resources, and these goals are performed in a predetermined pattern. For example, a telephone call constitutes a process, a request to print data is a process, and an order to purchase equipment is a process of the enterprise 10.

Simple messages can be used to accomplish complicated tasks, since it is the interpretation of the messages by the agents which gives the system the ability to adapt and change to needs of the system. Services are created by process agents.

Thus services can be created dynamically by having a process agent, which has the sole task to create and maintain services which can have various levels of quality, reliability etc. In this manner, the process agent acts as a provider of a supply of a service. In accordance with an embodiment of the invention, entities which request new services of processes post their request to an area of a blackboard. A request could for example come from an enterprise agent 20, as a dynamic request, or from an enterprise modeling tool which has collected via static input a process that needs to be added to the communication system. This spawns a process agent which is responsible for creating the requested process.

FIGS. 5 to 13 describe in detail one example of a signaling mechanism among agents for initialization, endowment, bidding, brokering and reallocation of services and resources among agents. It should be recognized that other signaling mechanisms could be used.

Figure 5A:
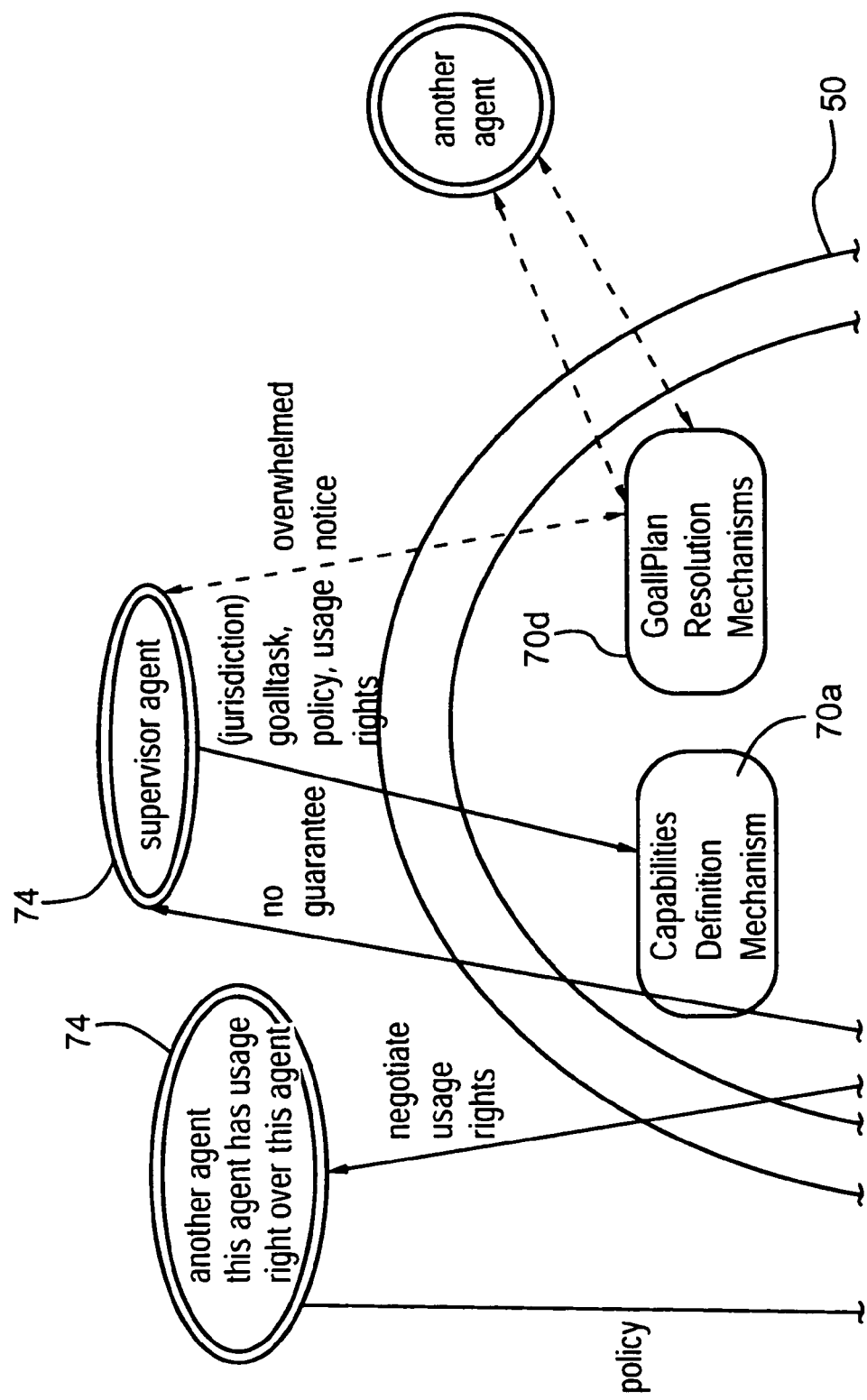
FIG. 5 illustrates a block diagram of an agent of FIG. 4.
Figure 5B:
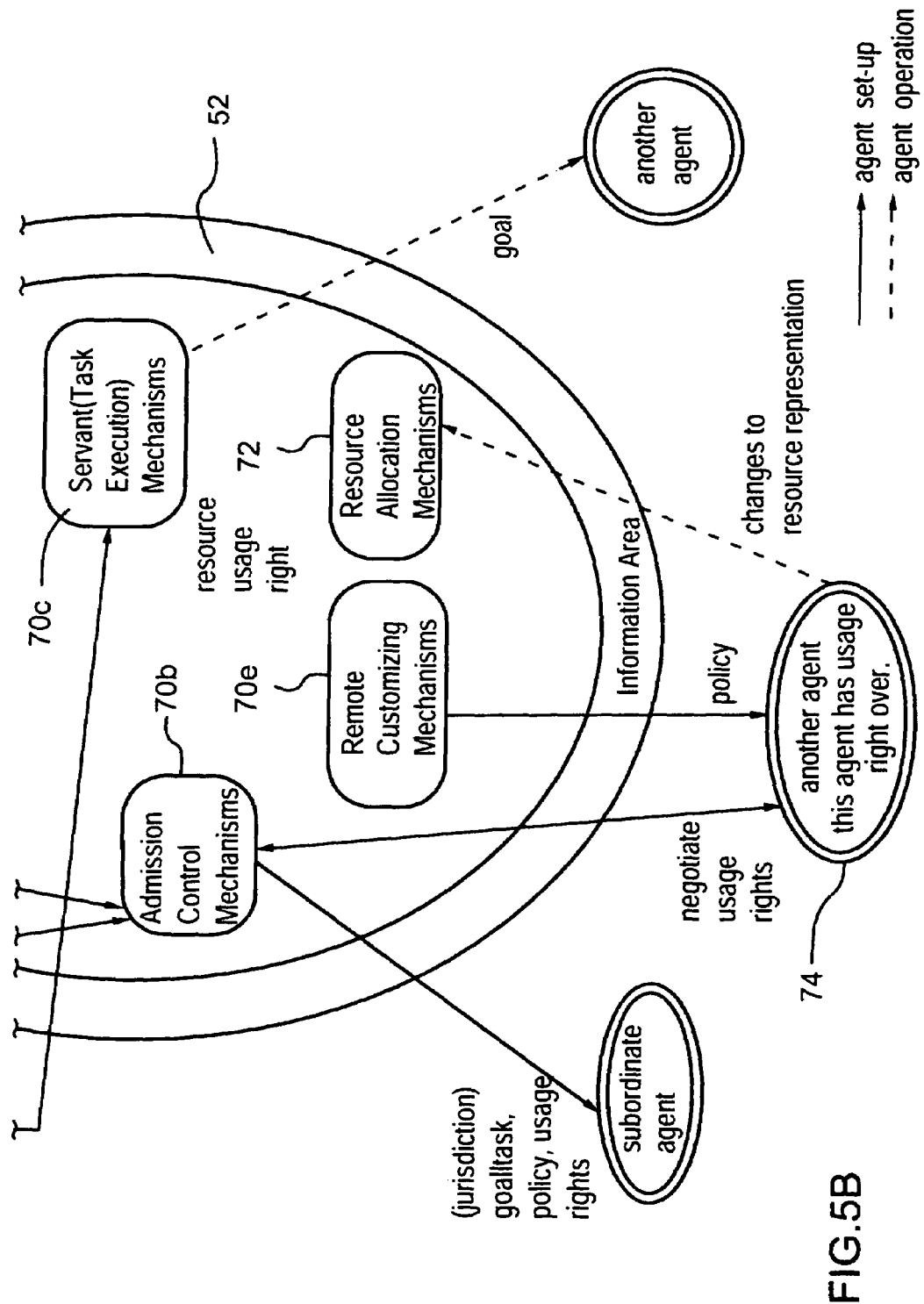

FIG. 5 illustrates an agent 50 in accordance with a preferred embodiment of the invention, and how it communicates with other agents. The solid arrows illustrate communication links during set-up, and the dashed line arrows illustrate communication links during operation.

The agent 50 is comprised of data in information area 52 and various routines 70, including the resource allocation mechanism 72. All of this is stored in memory. Routines shown in FIG. 5 are capabilities definition mechanisms 70a, admission control mechanisms 70b, servant (task execution) mechanisms 70c, goal or plan resolution mechanisms 70d, remote customizing mechanisms 70e. Links are shown to external (other) agents 74, such as a supervisory agent, a subordinate agent, another agent that has usage rights over agent 50, another agent over which this agent has usage rights, etc. In this manner, as part of the initialization, or for dynamic adjustment of the system while in operation where agent 50 supplies services to a higher level agent or supervisor, agent 74 acts as an assignor that assigns a supply of services to agent 50, with agent 50 responsible for holding and distributing its supply. In a similar manner, where agent 50 requires other services, a higher level or supervisor agent 74, (which may be another agent) acts as an endower that can endow agent 50 with utility for making requests for services.

Figure 6A:
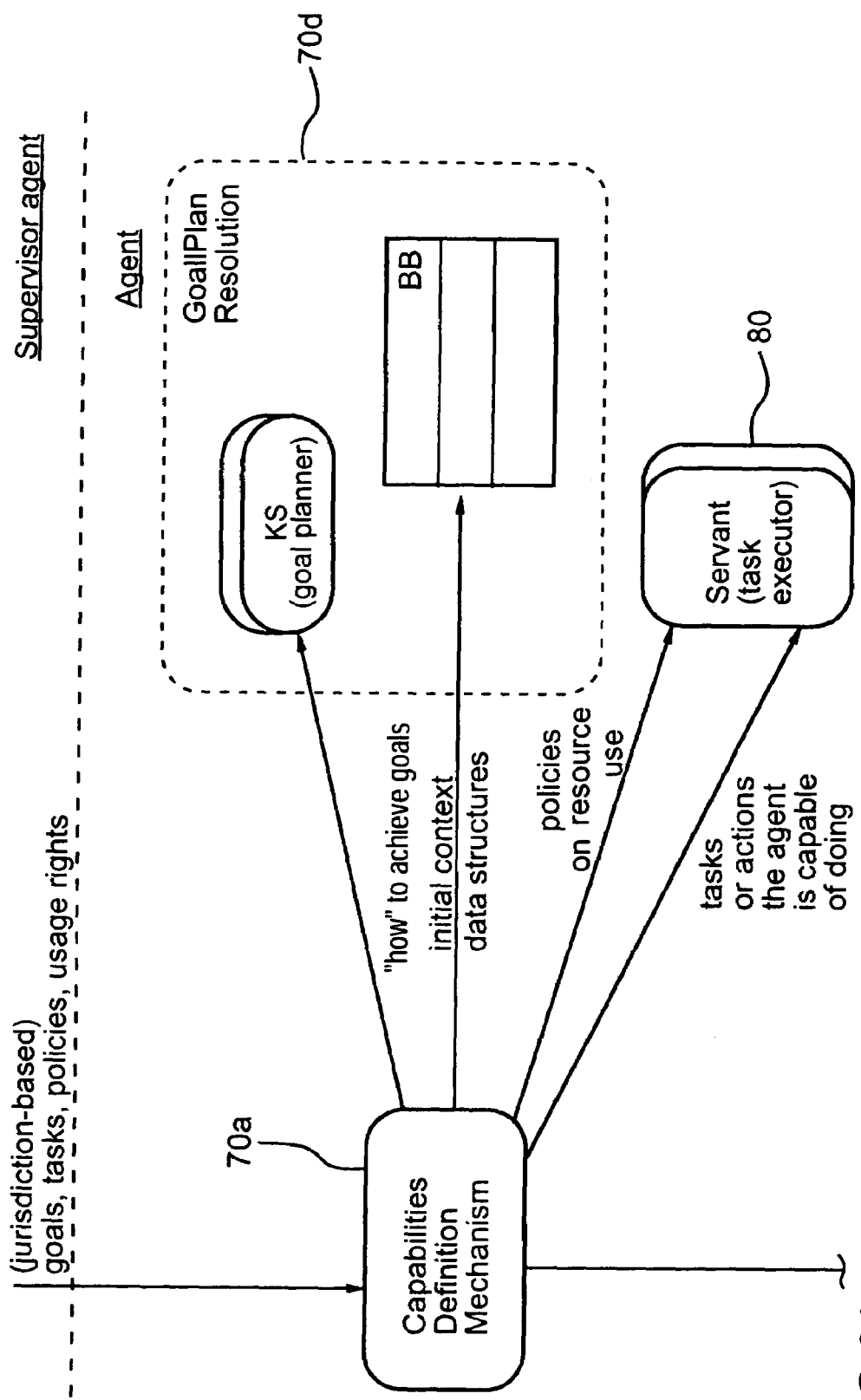
FIGS. 6, 7 and 8 illustrate the functions of various routines of agents of FIG. 4.
Figure 6B:
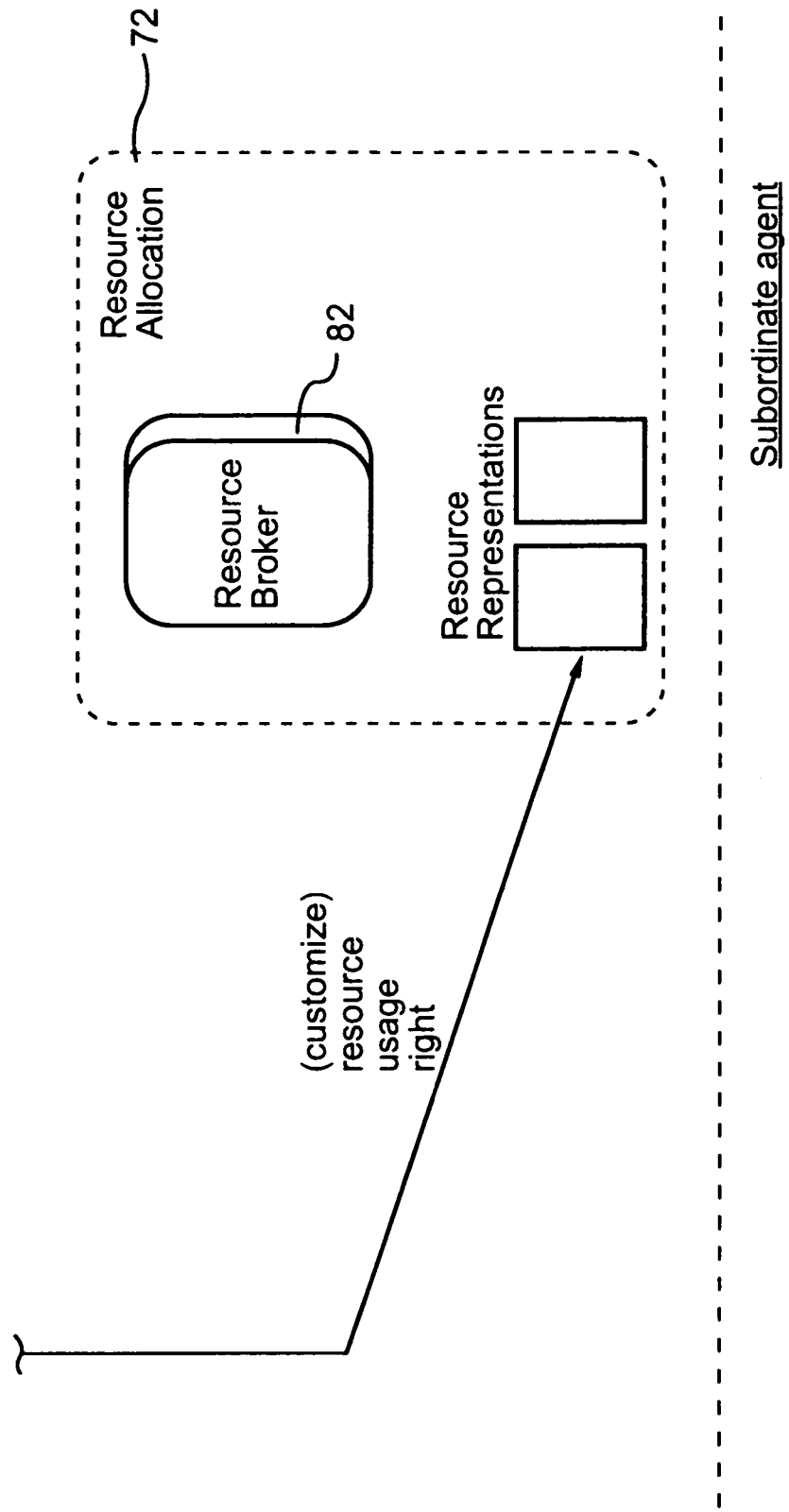

The various routines 70a and 70b have functions as is further described with reference to FIGS. 6 and 7.

The capability definition mechanism 70a receives goals, tasks, policies and usage rights from an agent which has jurisdiction over this agent, i.e. from a higher level agent. It creates knowledge sources and updates the blackboard structure in the act area (56, FIG. 4). The agent will also "know" how goals may be satisfied based upon how it is constructed and set up. The manner in which an agent can "know" is described by Daniel Dennet in her book "The International Stance". The ability of an agent to "know" how goals are satisfied facilitates the ability and directs the system to achieve those goals. This mechanism also places servant objects that can execute the possible tasks that will satisfy the different goals in the task executor 80. Representations are placed in a resource broker area 82 (representations of usage rights for resources in order to satisfy goals). This mechanism can add resources in excess of that provided by the group agent to meet local requirements; the local manager can "obtain" resources independent of the enterprise. It can also customize policies for the broker area.

Figure 7A:
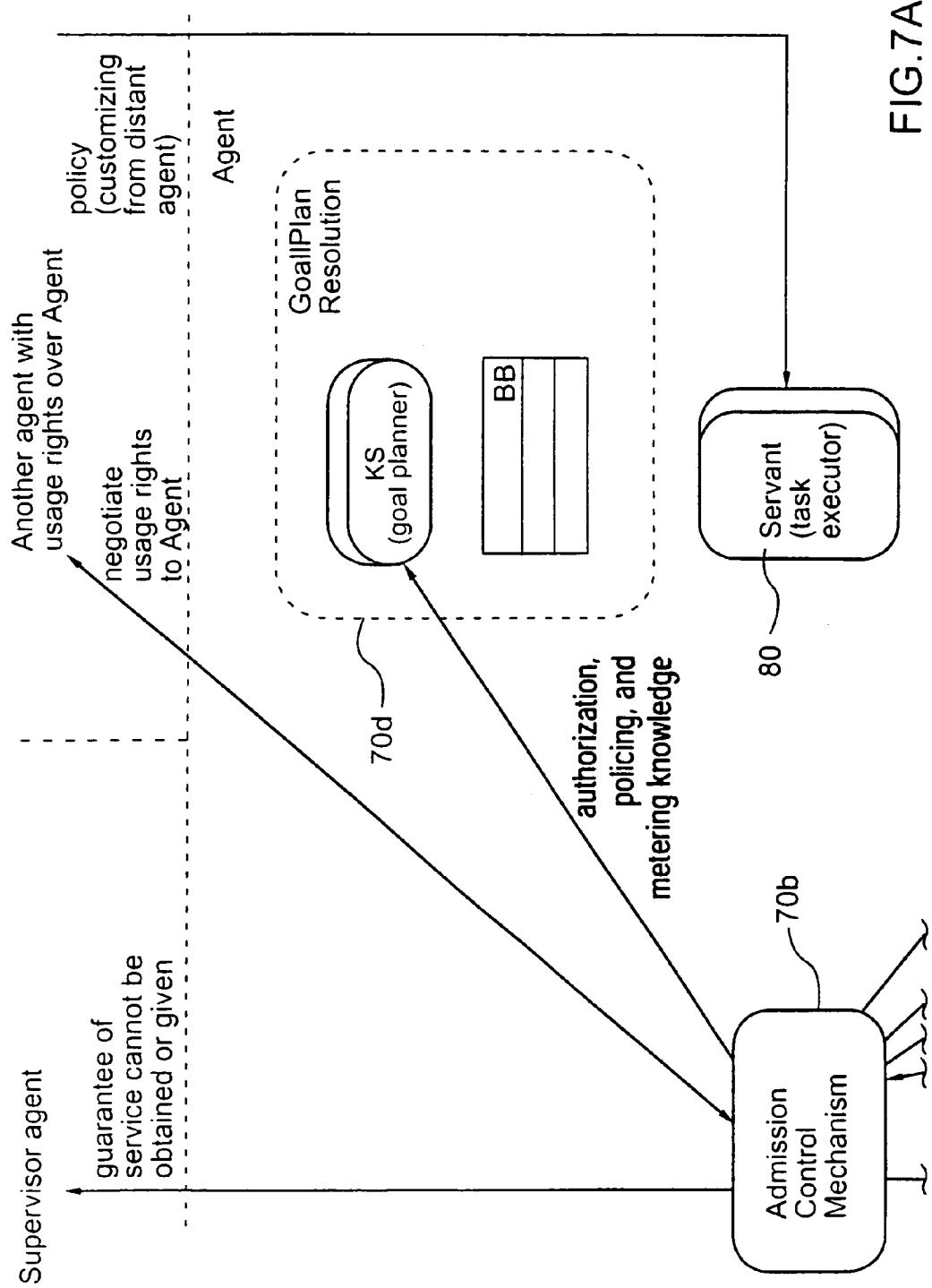
Figure 7B:
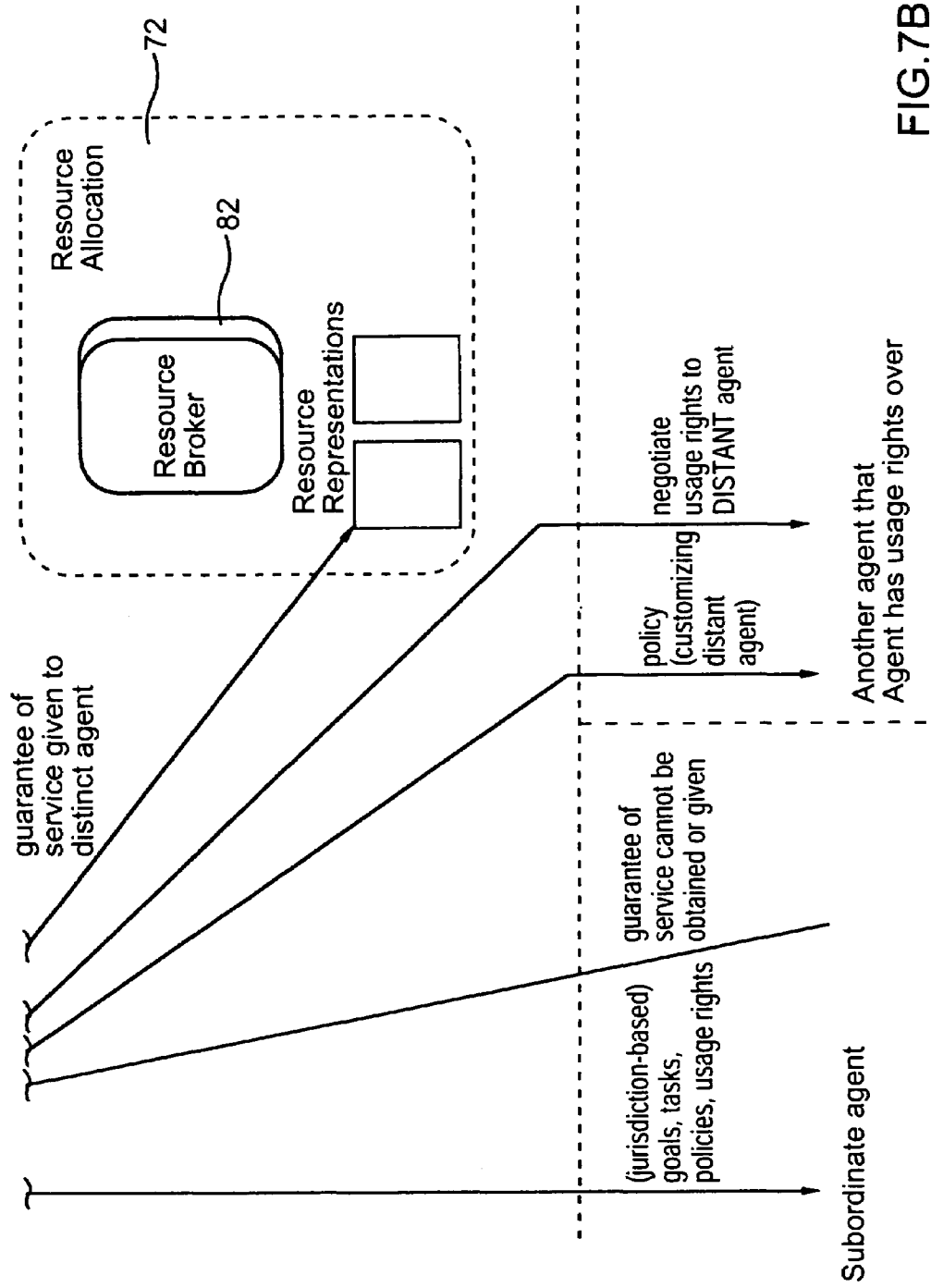

Turning to FIG. 7, the admission control mechanism 70b provides usage rights of this agent to other agents; it also provides performance guarantees to other agents regarding the resources in the resource allocation area 72. It contains methods for prediction of capacity and performance for the resources, including subsidiary agents, that it controls. The admission control mechanism 70b provides authorization and policing information to the act area 56, (in FIG. 4). It contains a method to create lower level agents and to provide these agents with usage rights (goals and resources). The data contained in this area is comprised of the capacity and capability of the agent and the resources under control of the agent.

It is also through this area that another agent can provide notice that it is overwhelmed by the number and/or capacity of service requests or lacks resources, or another agent an trigger a request for bids, or notify that a resource is being taken away. The data in this area also includes a measure of the current amount of capacity and quality that is being used by other agents and the amount of unused capacity.

Figure 8A:
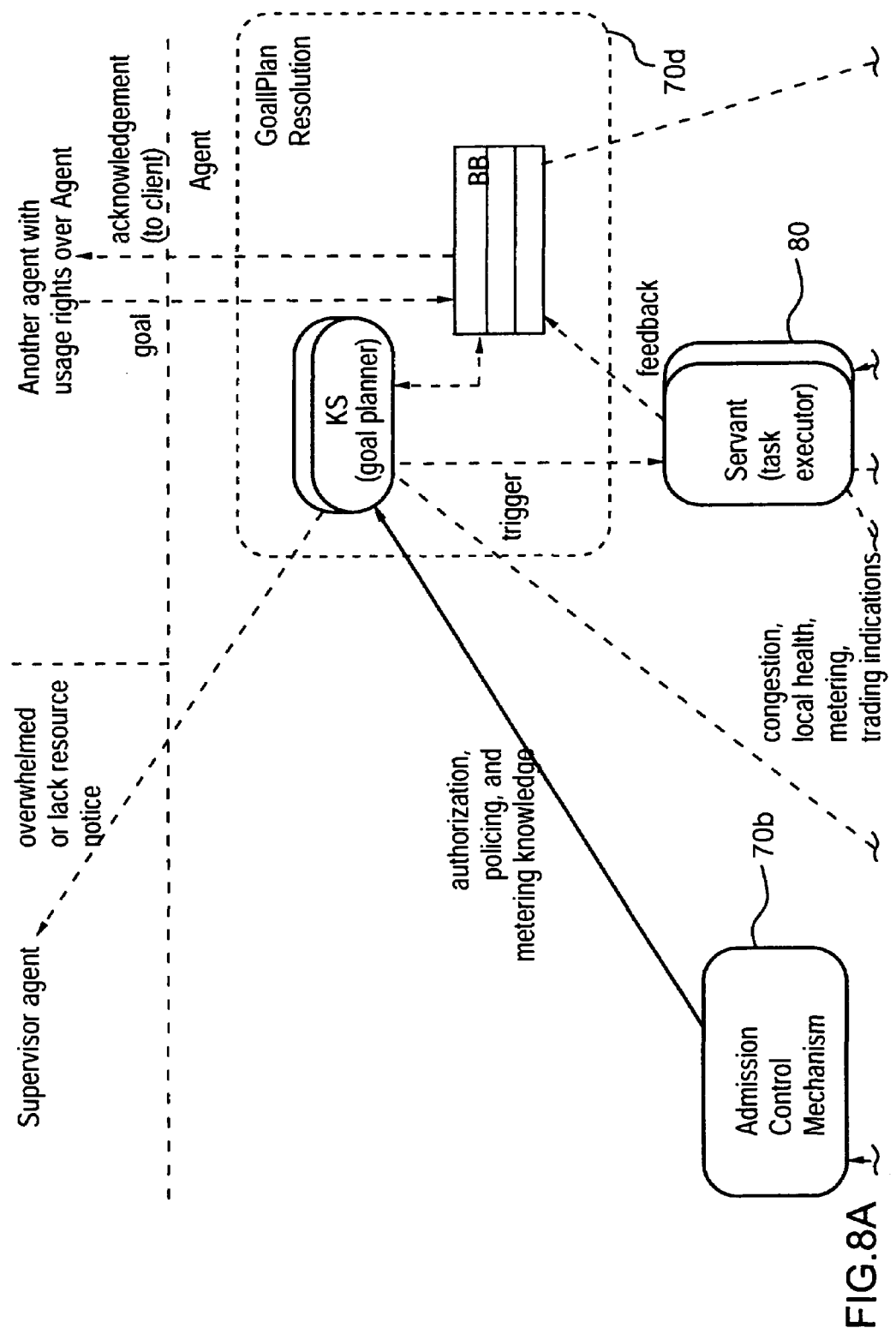
Figure 8B:
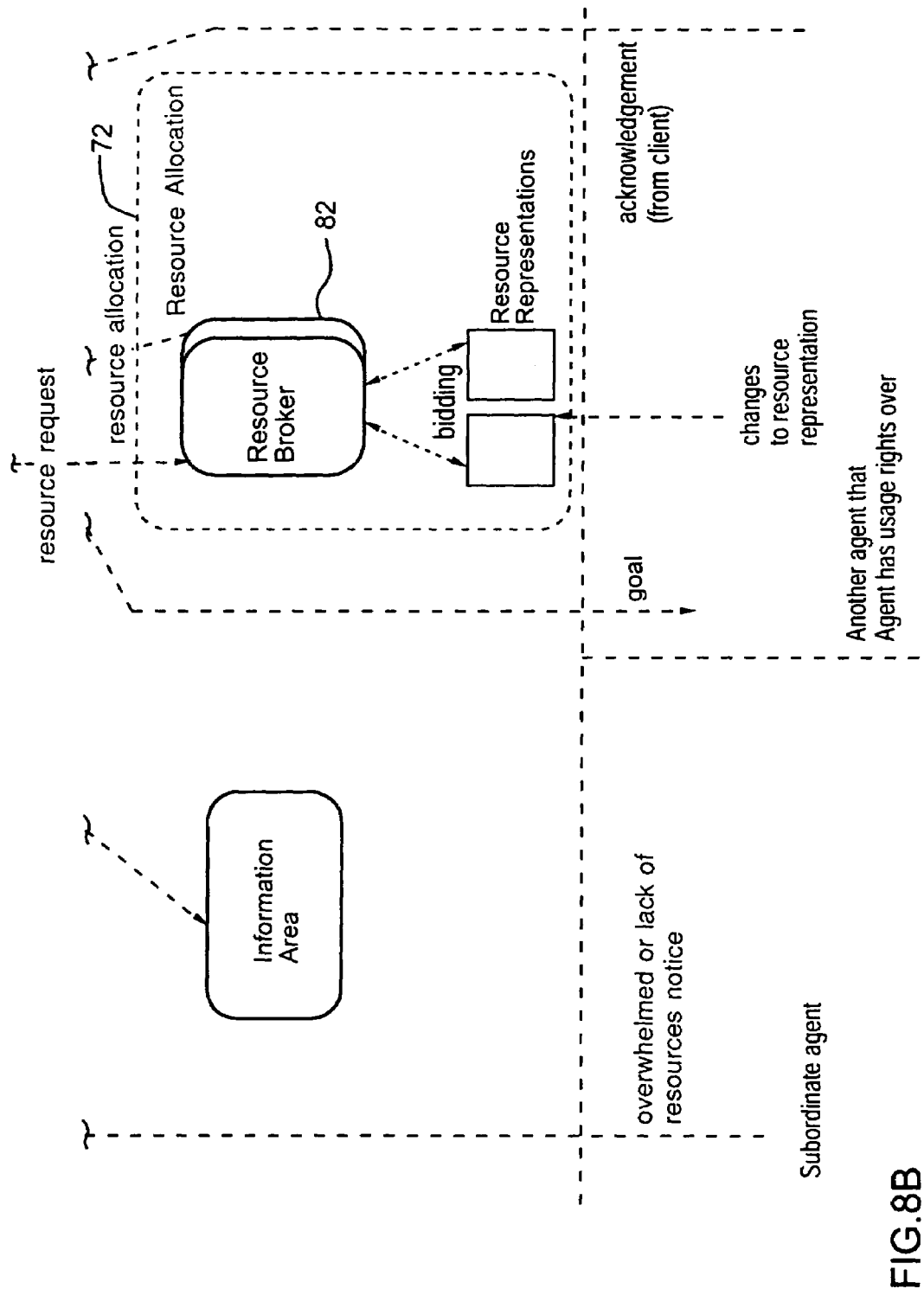

Turning to FIG. 8, the resource allocation mechanism 72 contains a local representation of resources and other agents that the agent has usage rights over, i.e. usage rights information, how much that agent is currently using of other agents or resources, and if necessary some information from the information or bulletin board area of the resource agent. This information is comprised of information relevant to the capability of other distant agent to provide the service that it has contracted from. This information from the distant information area, which can be in the form of resource representations can be updated periodically or instantaneously.

The agent takes part in a bidding process with another agent to supply resources to the agent, and exchanges usage rights guarantees and updates the resource provided a priori to the agent. When notice is provided by another agent for a request for bids, or that a resource is taken away, the notifying agent sends a message through the admission control mechanism 70b. The appropriate message is then passed to goal plan recognition mechanism 70d which sends message to task executor 80 which sends message to resource broker 82.

A resource broker 82 bids for resources for a task executor 80 of the agent based on policies which have been set up or previously endowed. Included within the endowment is the bidding resource allocation mechanism. The resources being bid for and obtained are stored as resource representations. The representation contains the address of physical resources, and thus the resource agent can update the representation for reasons of device failure or fault congestion, etc. The updating can be triggered dynamically, or periodically.

The resource broker 82 implements the bidding mechanism for the resource representations and send the resource allocation obtained back to the task executor 80, which posts feedback of the results to the bulletin board of the goal plan resolution area 70d. Appropriate notices are then sent back to supervising agents or other agents with usage rights over this agent.

Figure 9:
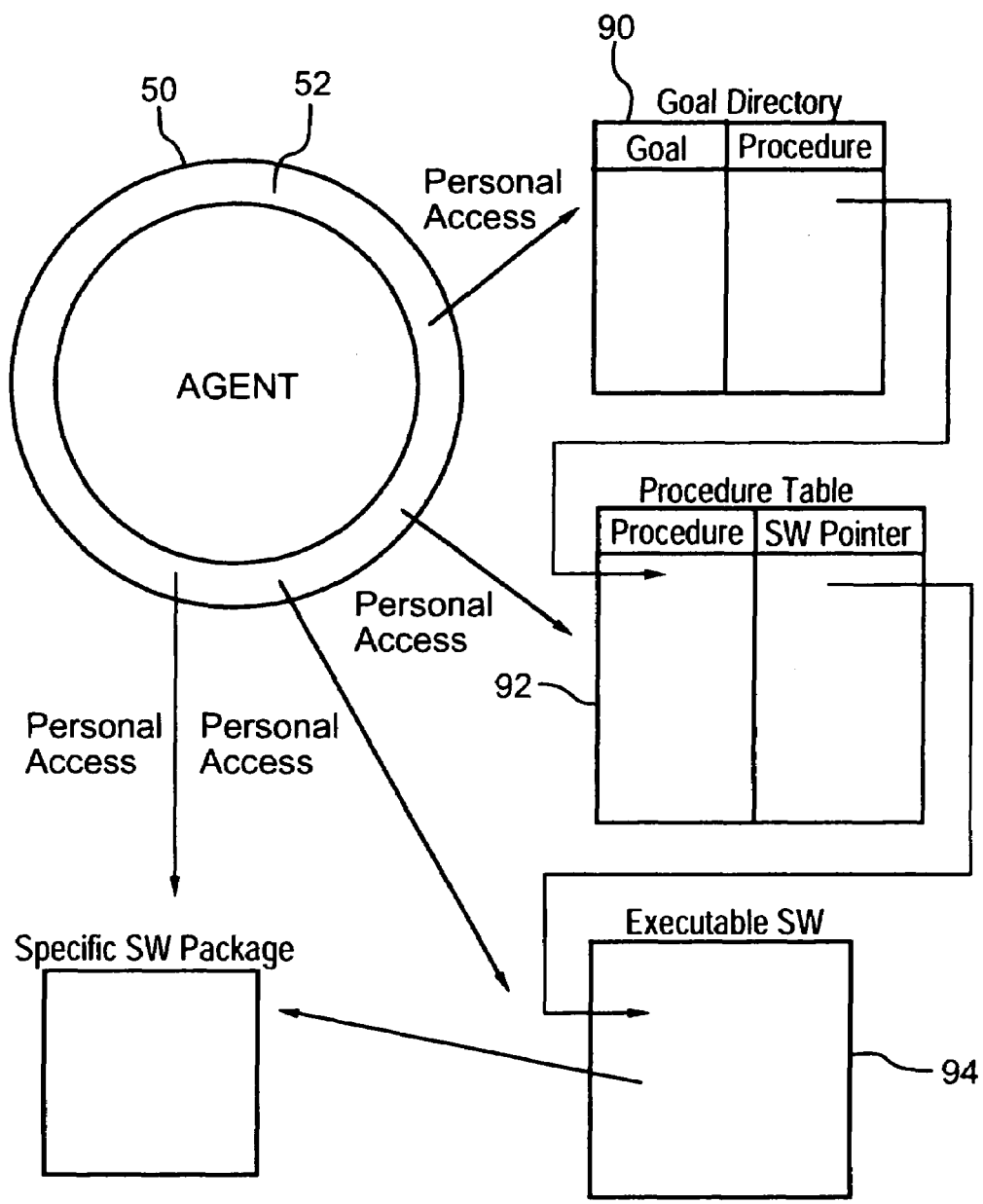
FIG. 9 is a block schematic diagram of a goal resolution mechanism of an agent.

With reference to FIG. 9, as an alternative to the blackboard type of system, a goal resolution mechanism could be used where goals are stored in the information area 52 and listed in goal directories 90. Each agent has access to its own goal directory, which contains a list of goals understood by the agent, and a procedure needed to accomplish each goal.

Each also has access to its procedure table 92, which, for a given procedure, has a pointer to a software program 94 to run it. These software programs are run to resolve the goals of the agent, including allocation and use of resources.

Figure 10:
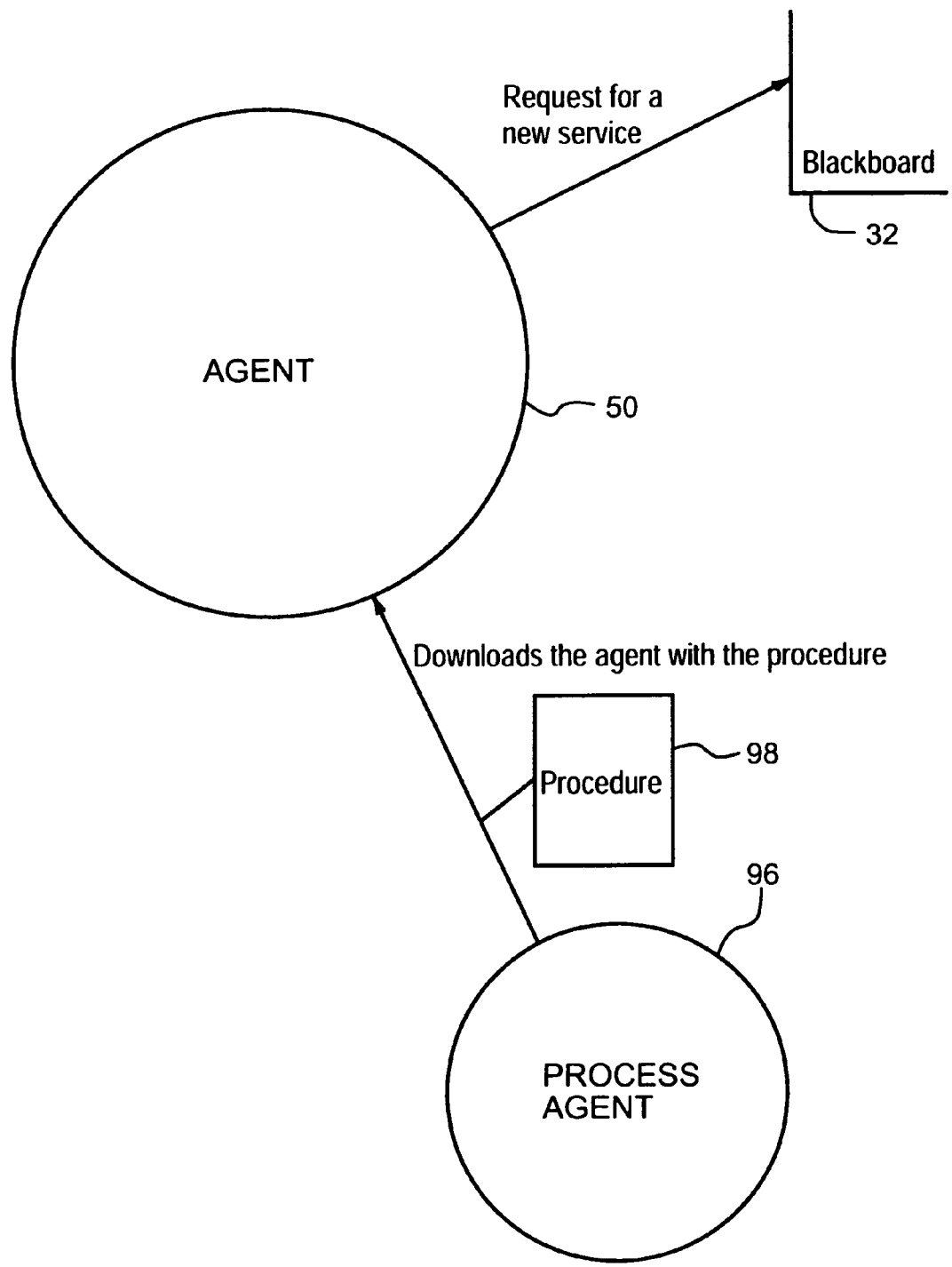
FIGS. 10, 11 and 12 illustrate various processes of creating new agents.

Turning to FIG. 10, in the case of an agent action to be created, it posts the request to blackboard 32. The process agent 96 that is chosen to construct the service creates a new procedure 98 which is downloaded into the agent 50. In this manner, a new service can be added and provided to other agents of the system. The service can also be updated and reconfigured in this manner. A new service can include the facilities to and access a new device of the system, as well as the features of the service available using the device. This also includes the features of quality and quantity of the resources available as part of the service.

Figure 11:
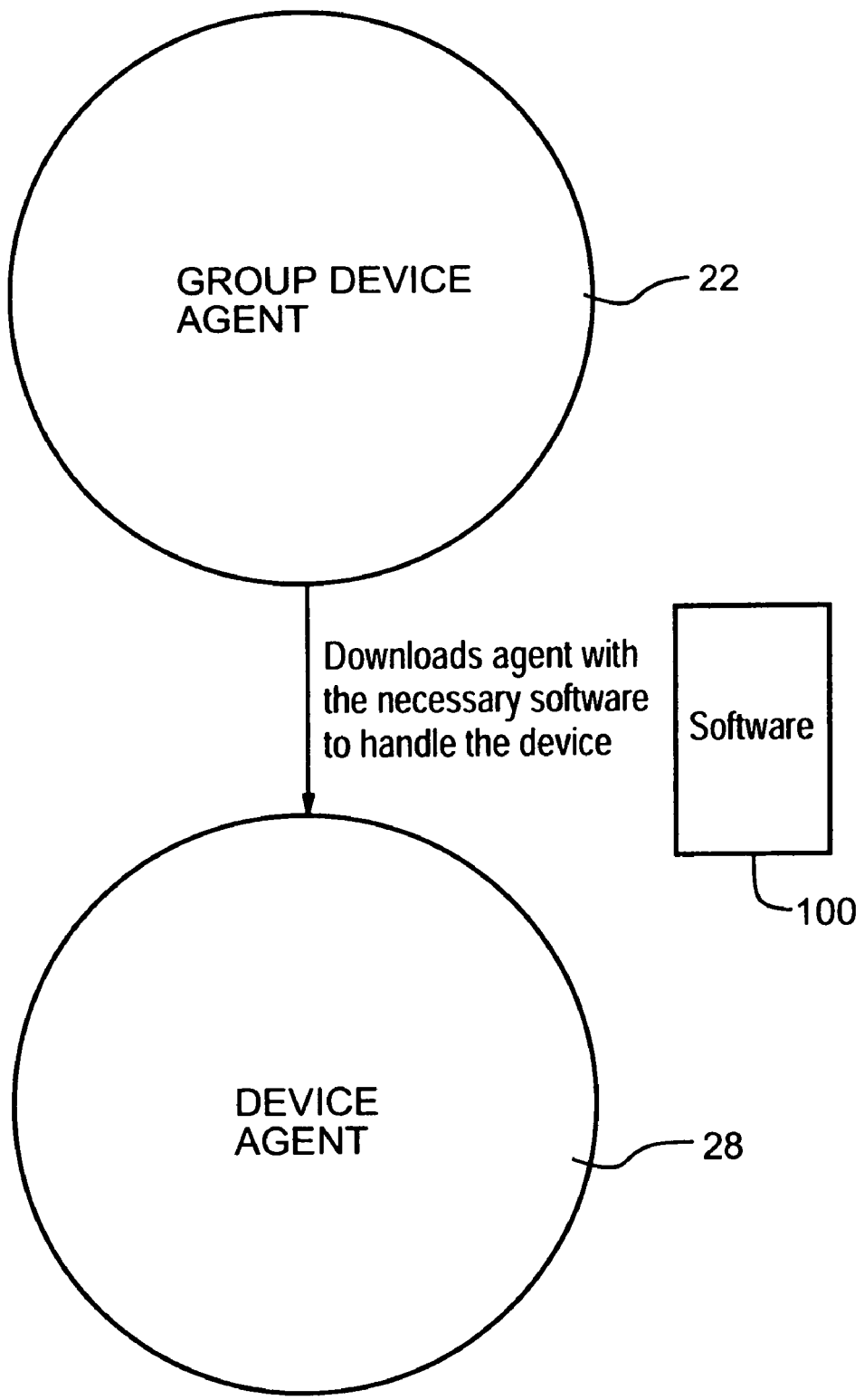

Turning to FIG. 11, in the case where a group device agent 32 wishes to create a new instance of a device agent 38, it can, through jurisdiction, download the new device agent 38 with the necessary software programs 100 to control a device controlled by the new device agent 38.

Figure 12:
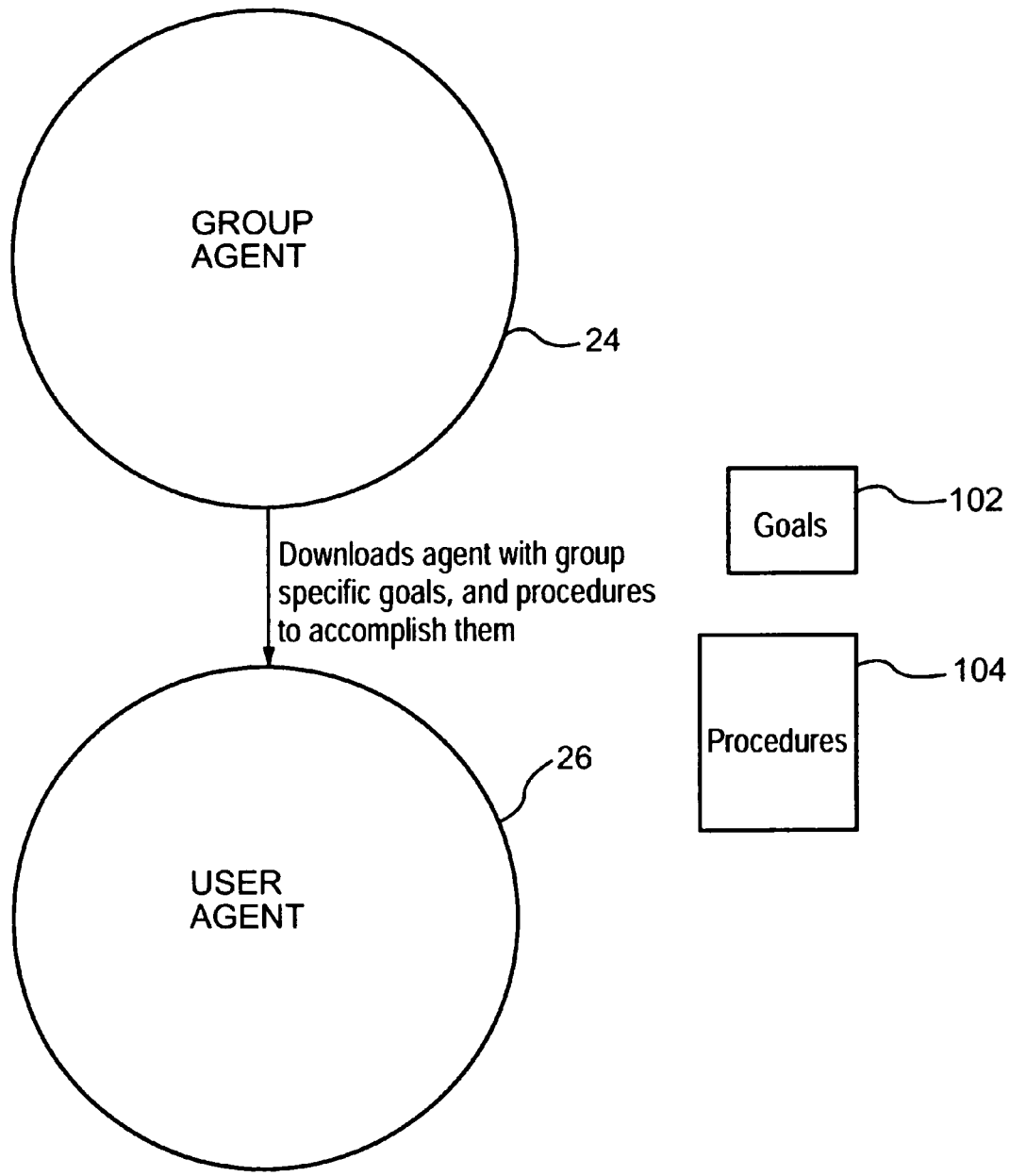

Turning to FIG. 12, in the case in which a group user agent 34 has jurisdiction over a user agent 36, in can endow that user agent 36 with group specific goals 102 and procedures 104 necessary to accomplish them, for the operation of the group, over which the group agent 34 has jurisdiction.

Figure 13:
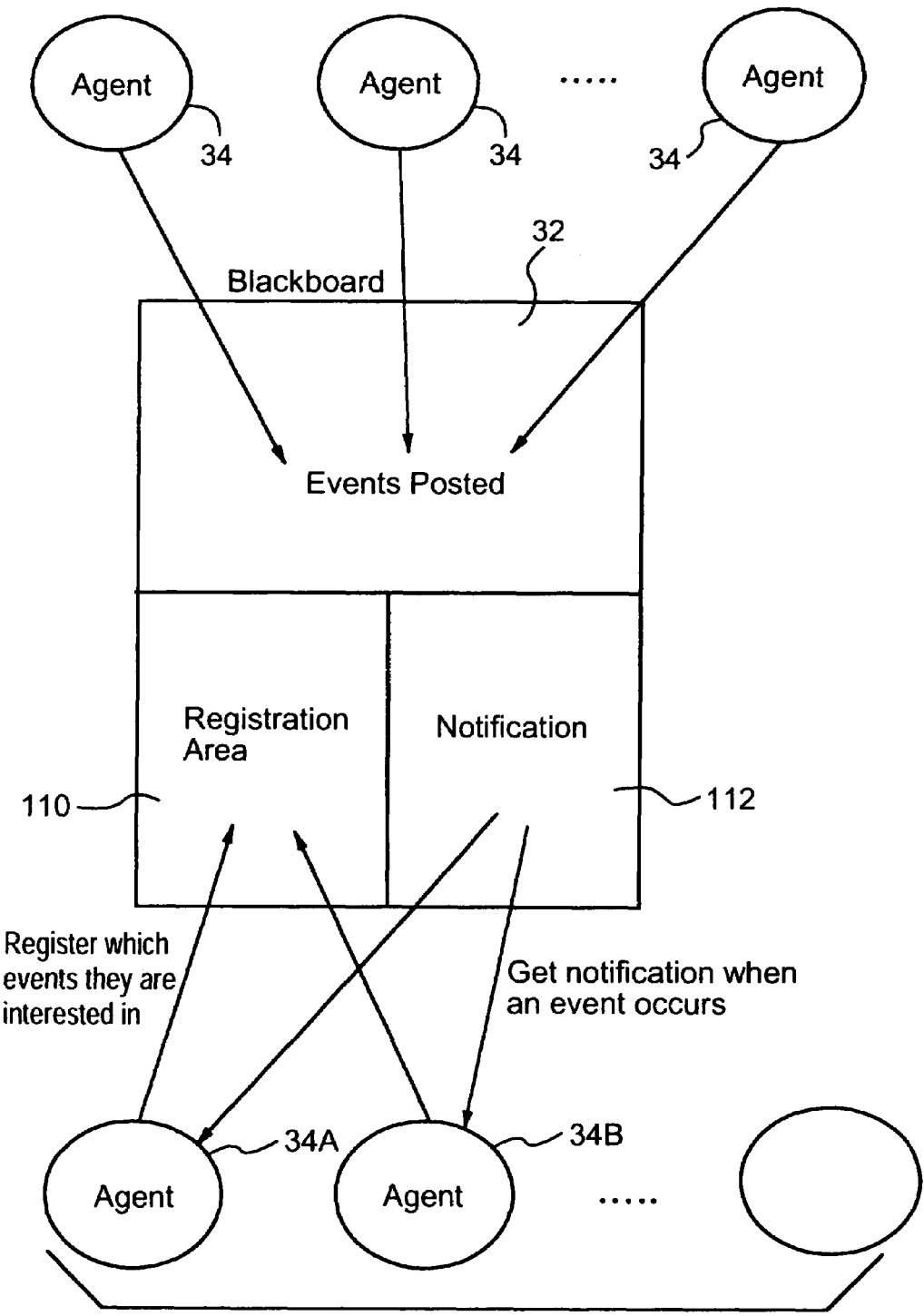
FIG. 13 illustrates a blackboard process of FIG. 3.

Turning to FIG. 13, when a significant event occurs in an agent 24, it posts that event to blackboard 22. Any agent 24a, 24b which is interested in the events registers that fact in registration area 110 of blackboard 22. When an event occurs, the blackboard is informed and all interested agents are notified, in a notification area 112.

The securing of a resource by a resource broker 82 is implemented through the concept of a holding price. The holding price is a measure of the amount, in terms of utility, that an agent must pay to hold a resource. An agent is endowed with utility to buy its needed resources. The agent spends what it wants to get the quantity of resource that it needs. It must spend or pay the holding price continually to maintain and hold resources.

Figure 14:
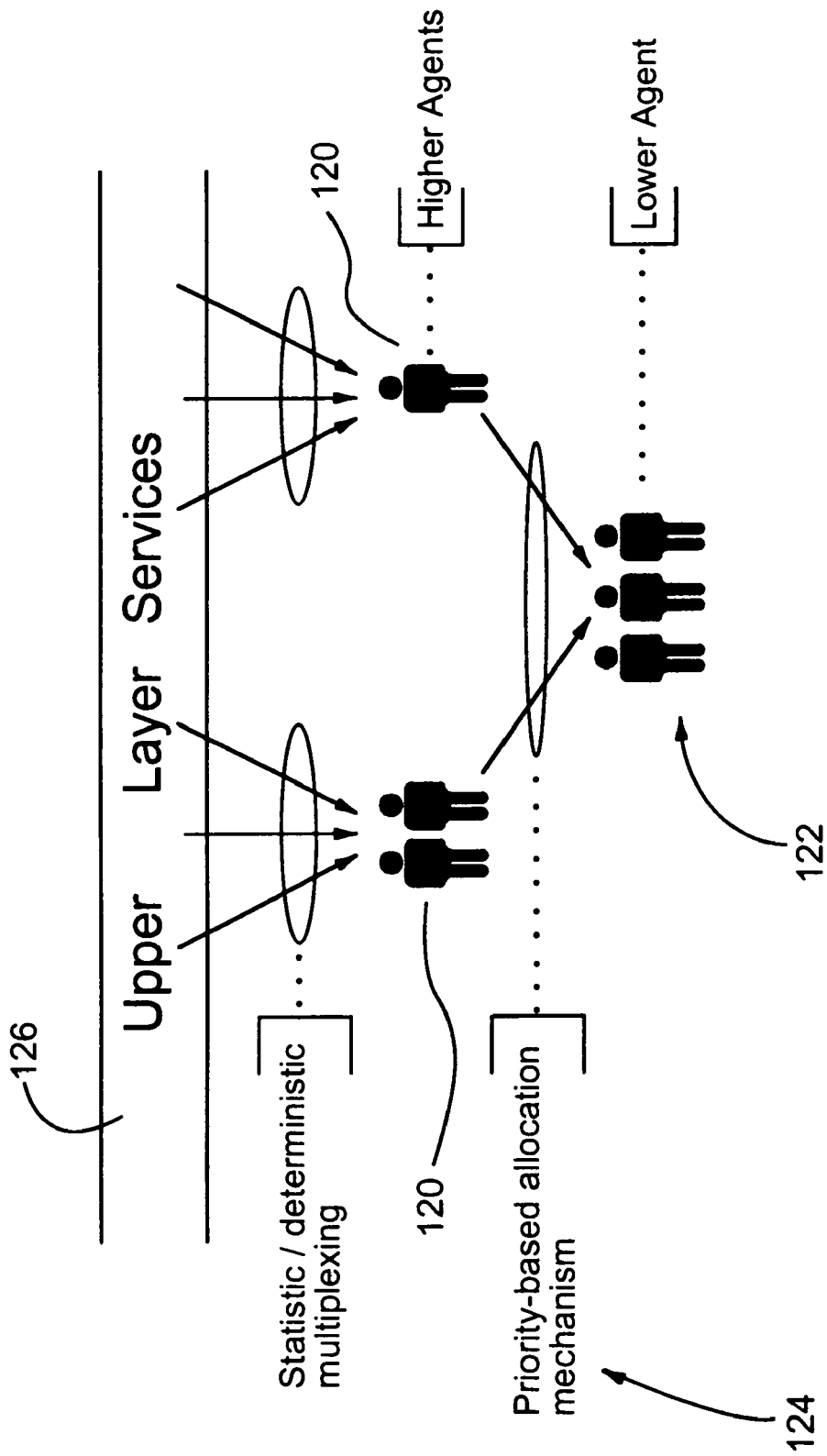
FIG. 14 is a diagram of the present invention depicting higher level agents sharing the services of lower level agents.

Turning to FIG. 14, the present invention is illustrated with an initialized system with higher level agents 120, lower level agents 122 and a bidding mechanism 124. Each of the agents is endowed with the necessary goals, resources and procedures to implement the bidding mechanism. They are also endowed with their utility and priority. The initial appointment of utility may be done by any well-known means. For example, all entities could be given an equal amount of utility, then utility could be dynamically adjusted to reduce or eliminate system or device failure. Optionally, utility could be apportioned based on a ranking criteria in measures according to importance in avoiding failure of the system or a sub component of the system. In the context of agents, this is expressed as a failure to achieve goals. The ranking may be done by a system operator beforehand, or by some dynamic automatic mechanism. It is obvious to one skilled in the art that other means are possible. This could also be facilitated in a mechanism of sliding constraints as described in further detail below. Thus, the agent can spend a high amount for necessary resources and lower amounts for less important resources. An example of the bidding mechanism is illustrated below. The market system assumes that the resource has been fully allocated to other agents when an agent makes a bid for its needed resources. The original allocation may be facilitated during initialization and configuration of the system. In this example, the agent is not bidding for an unused resource but is bidding enough utility so that it can take resources away from existing agents currently using the resource. This illustrates how the present invention provides for dynamic changes in the supply of services, such as adding a new resource or capability, or removal or degradation of a service or resource, a change in the allocation of utility, or a change in the requirements for services or resources by an entity.

The mechanism of the present invention is based on the principle of taking resources away from agents that pay less than the bidding agent is willing to bid. This has numerous benefits. First, it makes any amount of resource available to an agent if it has enough importance. Second, it removes resources from less important agents allowing, the system to adapt to the overall needs of the enterprise. Third, it encourages efficient use of resources since an agent must gain enough utility to pay for its resource. Therefore agents have an incentive not to squander utility on unneeded resources.

The following example describes a mechanism on how this allocation can be done, although, it is obvious to one skilled in the art that other mechanisms may be used.

An agent can be supplied with resources according to the following formulae.

Pc=current holding price of resource as held by an individual agent
Pb=bid price
Rc=current allocation of resource to agent
exp=exponent
Then allocation of resource to a bidding agent will be:

$$Rb=Rc((1-Pc/Pb)\hat{\ }exp)$$

if Pc>Pb then Rb=0

The exponent can be any value from 0 to 1 depending on the needs of the system. In the present example, the exponent of 0.5 is used for example purposes. This can be adapted so that different exponents can be used for the allocations of various resources in a system depending on the requirements of that environment.

The amount of Rb describes the amount of resource that will be taken away from an individual agent to supply a bid. Thus, prices for resources based on parameters such as Pc, Pb and Rc can be reasoned about concretely. The total supplied to the bidding agent will be the sum of the resources taken from all agents. This mechanism is used to generate an economic supply curve. Thus, prices can be established for any amount of resources from 0 to the maximum available.

The negotiation is conducted by a broker entity (such as an application or process), which in the agent context may be an agent or an aspect of an agent, using known communications protocols and messaging. Once the negotiation is complete, the broker communicates with the holding entities or agents for redistribution of the services or resources.

In the dynamic operation of the system, resources are sold and held by agents at a variety of amounts of utility. Agents paying high amounts of utility will not have their resources taken away from them by other agents. One clear example of resources being held by more important applications is the case of the trunk as a resource used for applications such as 911 calls and video conferences. The 911 call must never have resources taken from it without its permission. However a video conference is of less importance and can suffer poor quality without real harm to the enterprise. The mechanism above describes what proportion of an agents allocation will be taken away from it due to the bid of another agent. Thus if another agent bids more, a portion of its allocated resource will be taken away.

All agents who are paying less than a bidding agent is willing to pay will have a proportion of their resource allocation taken away. This means that an agent holding a resource can tell a bidding agent the amount that it will have to bid to get any quantity of resource up to the maximum. This will produce a supply curve for the resource which can be used by the bidding agent in its reasoning about the apportionment of its utility.

If a bidding agent is not willing to pay more for a resource than the current agent holding the resource, then it gets no resource from the holding agent.

Unallocated resources can be considered to be owned by the lower level agent. The holding price can be set to 0 or some higher amount to reflect the actual physical cost.

Turning to FIG. 14, each of the higher level-agents 120 are sharing their services among other upper level services 126. The higher level agents 120 have a measure of their own capacity which they are supplying to the upper layers services 126. This capacity can be shared or multiplexed in any number of ways. It can also be done deterministically in which an upper layer service has exclusive use over a portion of the capacity. It can be done statistically in which a number of upper level services will share a portion of the capacity.

The amount of statistical sharing possible is limited by the reliability required by the agent. High levels of sharing make for efficient use of the resources but run the risk of failure due to contention for the resource among the agents. Upper level agents 120 can indicate or stipulate the reliability that they require. The higher layer services 126 can set their sharing parameters to allocate adequate resources so that the chance of failure due to resource contention among agents is set at an acceptable level. That is, more resources or capability of a resource can be given to applications requiring more reliability to minimize the chances of contention.

Capacity of a resource may be measured using conventional means and in a preferred embodiment measured and determined using a service model. Service models are well known in the art and are successfully used for modeling, simulation and resource determination according to probability distributions such as Poisson, Erlang A., B and C. or Engset. The service model can be used to translate a request by a bidding agent for a specific quantity and quality of service from an upper level into a specific resource capacity which can be shared among agents. This leads to the ability of the system to incrementally allocate services. If the higher layer receives a request for a specific service level, it will match this through service models with the capacity and quality of service which must be obtained from lower level services to meet this requirement. This is achieved through the mechanism of 'resource sets'. The resource set is a detailed description of the resources available and may be characterized as a set of descriptors. Each of the descriptors describes a set of resources which can together be used to satisfy a service request to a specified level of service along with the capacity of each resource required. The resource set can be implemented as a set of tuples or key value pairs loaded or configured in the system.

For example; a resource set could be:

---

Resource Descriptor (1),
    Resource (name of resource), Capacity (capacity of resource)
    Resource (name of resource), Capacity (capacity of resource)
    .
    .
    .

-continued

```
Resource Descriptor (2),
    Resource (name of resource), Capacity (capacity of resource)
    Resource (name of resource), Capacity (capacity of resource)
        .                           .
        .                           .
        .                           .
```

A service level may be met with one of several configurations of lower level agents. Each of these configurations can be described as a resource set. Within the higher agent, each service level is matched with a group of resource sets which can accomplish it. The higher agent can combine the services of one or more lower level agents to create its required service. It estimates the capacity required of each through service models which translate its service level request into an appropriate service level at the lower agent levels. If it has sufficient quantity of one of the lower level services, it can grant the request immediately. If not it must request the capacity.

As shown in the diagram, the lower level agent 122 is sharing its services among several higher level agents 120. To do this sharing fairly, it must have guidance from the system as to the relative priorities it should put on requests from different agents. Although this may be done simply but crudely by the endowment of priority, in the preferred embodiment this is done through a mechanism called 'sliding constraints' based on the concept of 'importance'. This 'importance' measure has been endowed or encoded by the quantity of economic utility which has been supplied to each of the higher level agents. It will make available to each of these upper level agents 120 capacity within a constraint based on this importance. This can be done incrementally. During operation the upper level agents 120 will have been assigned capacities to meet their requests. With a new request, the lower level agent 122 can meet this request through use of a proportion of its unallocated capacity and portions of the capacity of less important agents. This means that if necessary the lower agents can take capacity away from less important agents to meet the needs of the more important. Thus the capacity supplied to higher level agents are constraints on their usage of the lower level service which slide with requests and their relative importance.

Upon a service request, the lower level agent will reassess the service it supplies to its higher layers and make sufficient reallocations to meet it. It will then inform the affected higher layers of the reallocations. These will in turn reallocate their capacity among the agents that they are serving.

This system has the benefit of being adaptive and self-configuring. Resources and services will be allocated on the basis of the needs of the overall system as indicated by the relative importance factors. These factors can be changed during operation to meet new contingencies in service opportunities or to address failure. The resource and service allocation of the system will automatically adjust to meet these new requirements. For example if a resource assigned to an important application fails. The necessary amount of resource can be removed from the capacity assigned to another agent or agents. The agent or agents can then handle this as it or they would handle a service request and reassign its resource to upper level resources. The important agent would be maintained at the expense of those at lesser importance. If a service suddenly becomes more important, for example to handle an emergency it can be given a higher importance. As the newly important service is exercised, it can take resources from other agents. Thus the mechanism is adaptive to the needs of the system by being able to reallocate on request and it is self-configuring since it handles the contention for resources automatically.

Alternative Embodiments

The exponent can be changed to balance the amount of resources that will be taken away from low priority resources. An exponent close to 1 will cause resources to be taken preferentially from low priority agents. Exponents closer to 0 will cause resources to be removed from all lower bidding agents. This exponent may be tailored to the agents needs. The trade off can be done considering the factor it is better to deny a service request or to slow the response to all service request by accommodating it. This trade off can be done in the context of the shared resource and can be tuned to its needs.

Although the invention has been described in terms of the preferred and several alternate embodiments described herein, those skilled in the art will appreciate other embodiments and modifications which can be made without departing from the sphere and scope of the teachings of the invention. All such modifications are intend to be included within the scope of the claims appended hereto.

The invention claimed is:

1. A method for service allocation among a plurality of entities requiring service allocation in a communications or computing environment comprising the steps of:
   a) initializing a supply of services of one or more holding entities;
   b) endowing one or more bidding entities with a fixed amount of utility and a requirement for an amount of said supply of services, wherein said fixed amount of utility represents less than, equal to, or more than the amount of said supply of services the bidding entity could require to function at a particular time, said fixed amount of utility thereby also represents the possibility of failure due to a lack of resources;
   c) negotiating said supply of services of said holding entities, with each bidding entity bidding a selected amount of its said fixed amount of utility;
   d) redistributing said supply of said holding entities among said bidding entities, wherein said redistribution is based upon a proportion of said supply held by said holding entity using a holding price, said proportion being described by the formula:
   $R_c(1-P_c/P_b)^{exp}$, wherein $R_c$ is the current allocation of resource to said holding entity, Pc is the current holding price of said resource as held by said holding entity, Pb is the bid price and exp is an exponent.

2. The method of claim 1, wherein said supply of services is comprised of a plurality of resources.

3. The method of claim 2, wherein said plurality of resources are available at multiple service levels.

4. The method of claim 1, wherein said initializing, said endowing, said negotiating and said redistributing operate dynamically in response to a change in said supply of services, said fixed amount of utility or said requirement for said supply of services.

5. The method of claim 1, wherein said redistributing represents a guarantee of service.

6. The method of claim 2, wherein said resources are one or more physical devices.

7. The method of claim 3, wherein said multiple service levels includes said resources available at varying levels of quality.

8. The method of claim 3, wherein said multiple service levels includes said resources available at varying capacities.

9. The method of claim 3, wherein said multiple service levels are determined by resource sets.

10. The method of claim 1, wherein exp=0.5.

11. The method of claim 1, wherein each said bidding entity is represented by an agent.

12. The method of claim 11, wherein each said supply of services is represented by an agent.

13. The method of claim 12, wherein said holding entity is represented by an agent.

14. The method of claim 6, wherein said physical devices are a plurality of telephones, telephone interface circuits, trunk interface circuits, telephone lines and telephone switches for establishing or maintaining a voice or data communication.

15. A system for service allocation among a plurality of entities requiring service allocation in a communications or computing environment comprising:
   a) one or more holding entities having a supply of services;
   b) a plurality of bidding entities endowed with a fixed amount of utility and a requirement for an amount of said supply of services, wherein said fixed amount of utility represents less than, equal to, or more than the amount of said supply of services the entity could require to function at a particular time, said fixed amount of utility thereby also represents the possibility of failure due to a lack of resources;
   c) a broker in communication with said holding entities and said bidding entities for negotiating said supply of said holding entities, with each bidding entity bidding a selected amount of its said fixed amount of utility;
   wherein said holding entity provides redistribution of said supply among said bidding entities based on a proportion of said supply held by said holding entities using a holding price, said proportion being described by the formula:

$R_c(1-P_c/P_b)^{exp}$, wherein $R_c$ is the current allocation of resource to said holding entity, Pc is the current holding price of said resource as held by said holding entity, $P_b$ is the bid price and exp is an exponent.

16. The system of claim 15, wherein said supply of services is comprised of a plurality of resources.

17. The system of claim 16, wherein said plurality of resources are available at multiple service levels.

18. The system of claim 15, wherein said holding entities, said bidding entities and said broker operate dynamically in response to a change in said supply of services, said fixed amount of utility or said requirement for said supply of services.

19. The system of claim 15, wherein said redistribution of said supply represents a guarantee of service.

20. The system of claim 16, wherein said resources are one or more physical devices.

21. The system of claim 17, wherein said multiple service levels include said resources available at varying levels of quality.

22. The system of claim 17, wherein said multiple service levels including resources available at varying capacities.

23. The system of claim 17, wherein said multiple service levels are determined by resource sets.

24. The system of claim 15, wherein exp=0.5.

25. The system of claim 15, wherein each said bidding entity is represented by an agent.

26. The system of claim 25, wherein each said supply of services is represented by an agent.

27. The system of claim 26, wherein said holding entity is represented by an agent.

28. The system of claim 20, wherein said physical devices are a plurality of telephones, telephone interface circuits, trunk interface circuits, telephone lines and telephone switches for establishing or maintaining a voice or data communication.

* * * * *